US012649167B2

(12) United States Patent
Lee

(10) Patent No.: US 12,649,167 B2
(45) Date of Patent: Jun. 9, 2026

(54) PLUNGER SYSTEM, DEVICE AND METHOD

(71) Applicant: Red Devil, Inc., Tulsa, OK (US)

(72) Inventor: George L. Lee, Tulsa, OK (US)

( * ) Notice: Subject to any disclaimer, the term of this patent is extended or adjusted under 35 U.S.C. 154(b) by 474 days.

(21) Appl. No.: 18/305,266

(22) Filed: Apr. 21, 2023

(65) Prior Publication Data

US 2023/0256466 A1 Aug. 17, 2023

Related U.S. Application Data

(63) Continuation-in-part of application No. 17/531,113, filed on Nov. 19, 2021, now Pat. No. 12,054,334.

(51) Int. Cl.
*B05C 17/005* (2006.01)
*B65D 83/763* (2025.01)

(52) U.S. Cl.
CPC ...... *B05C 17/00576* (2013.01); *B65D 83/763* (2025.01)

(58) Field of Classification Search
CPC .......... B05C 17/0123; B05C 17/00586; B05C 17/00583; B05C 17/00576
See application file for complete search history.

(56) References Cited

U.S. PATENT DOCUMENTS

| | | | | |
|---|---|---|---|---|
| 1,965,271 | A | 7/1934 | Wharton | |
| 3,782,598 | A | 1/1974 | Basa | |
| 4,615,469 | A | 10/1986 | Kishi et al. | |
| 5,161,715 | A | 11/1992 | Giannuzzi | |
| 5,170,911 | A | 12/1992 | Della Riva | |
| 5,301,835 | A * | 4/1994 | Fulks | B05C 17/00576 222/105 |
| 5,358,501 | A | 10/1994 | Meyer | |
| 5,368,206 | A | 11/1994 | Sandrin | |
| 5,704,518 | A | 1/1998 | Vanmoor | |

(Continued)

FOREIGN PATENT DOCUMENTS

| | | | | |
|---|---|---|---|---|
| CH | 669165 A5 * | 2/1989 | | B05C 17/01 |
| EP | 592741 A2 | 4/1994 | | |

(Continued)

OTHER PUBLICATIONS

Machine translation of CH-669165-A5.*
DEWALT Product Catalog, "Clear Sausage Tube Conversion Kit DCE5802", p. 45, Copyright © 2019 DEWALT.

*Primary Examiner* — Jeremy Carroll
(74) *Attorney, Agent, or Firm* — David Guerra

(57) ABSTRACT

A plunger for dispensing a material from a collapsible package in a package tube. The plunger includes a main wall a plurality of sectors. The sectors include a flange extending therefrom at an angle to create a plunger side configured to receive an end of the collapsible package. The sectors adjacent to each other are separated by a slot defined through the flange and the sectors. The sectors are configured to bend in relation to the main wall when a predetermined force is applied to the sectors by the end of the collapsible package. The plunger can be utilized with a dispensing system for dispensing material contained in the collapsible package from a dispensing device. The dispensing system includes a piercing nozzle attachable to a dispensing end of the dispensing device, and the plunger attachable to a plunger rod configured to compress the package against the piercing nozzle.

18 Claims, 11 Drawing Sheets

(56) References Cited

U.S. PATENT DOCUMENTS

| | | | |
|---|---|---|---|
| 5,775,539 | A | 7/1998 | Bates et al. |
| 5,855,298 | A | 1/1999 | Teetsel, III et al. |
| 6,234,348 | B1 | 5/2001 | Okamura et al. |
| 6,564,970 | B1 | 5/2003 | Walch et al. |
| 6,578,482 | B2 | 6/2003 | Wakayama et al. |
| 6,848,906 | B2 | 2/2005 | Albach |
| 6,899,028 | B2 | 5/2005 | Arai et al. |
| 7,086,431 | B2 | 8/2006 | D'Antonio et al. |
| 7,249,695 | B2 | 7/2007 | Shew |
| 7,637,392 | B2 | 12/2009 | Hsu et al. |
| 8,424,727 | B2 * | 4/2013 | Herman ............... B65D 83/765 222/105 |
| 8,448,825 | B2 | 5/2013 | Mitrovic et al. |
| 8,506,904 | B2 | 8/2013 | Tajima et al. |
| 8,602,260 | B2 | 12/2013 | Pierson et al. |
| 9,039,557 | B2 | 5/2015 | Naughton et al. |
| 9,694,384 | B2 | 7/2017 | Herman et al. |
| 9,862,533 | B2 | 1/2018 | Stever et al. |
| D871,177 | S | 12/2019 | Pentland |
| 10,596,591 | B2 | 3/2020 | Lee, III |
| 10,640,280 | B2 | 5/2020 | Herman et al. |
| 10,766,053 | B2 | 9/2020 | Lee, III |
| 10,947,097 | B2 | 3/2021 | Clifton |
| 2006/0091032 | A1 | 5/2006 | Tsai |
| 2007/0038149 | A1 | 2/2007 | Calasso et al. |
| 2008/0011784 | A1 * | 1/2008 | Schneider ......... B05C 17/00583 222/105 |
| 2008/0023495 | A1 | 1/2008 | Takayama et al. |
| 2008/0058863 | A1 | 3/2008 | Quintero et al. |
| 2010/0320234 | A1 | 12/2010 | Punchenko |
| 2012/0180688 | A1 | 7/2012 | Padgett |
| 2012/0203194 | A1 | 8/2012 | Cederschild et al. |
| 2013/0270293 | A1 | 10/2013 | Dresser |
| 2015/0267679 | A1 | 9/2015 | Canal Vila et al. |
| 2019/0168252 | A1 | 6/2019 | Springhorn |

FOREIGN PATENT DOCUMENTS

| | | | |
|---|---|---|---|
| EP | 782886 | A2 | 7/1997 |
| EP | 782886 | A3 | 1/1998 |
| EP | 1012069 | A1 | 6/2000 |
| EP | 1012069 | A4 | 6/2000 |
| EP | 782886 | B1 | 3/2002 |
| EP | 1012069 | B1 | 2/2003 |
| EP | 3345685 | A2 | 7/2018 |
| EP | 3345685 | A3 | 10/2018 |
| EP | 3829783 | A2 | 6/2021 |
| GB | 2374070 | A | 10/2002 |

* cited by examiner

PLUNGER SYSTEM, DEVICE AND METHOD

CROSS-REFERENCE TO RELATED APPLICATION

This application is a continuation-in-part under 35 U.S.C. § 120 based upon co-pending U.S. patent application Ser. No. 17/531,113 filed on Nov. 19, 2021, the entire contents of which is incorporated herein by reference.

BACKGROUND

Technical Field

In some aspects, the present technology relates to a plunger. In some other aspects, the present technology relates to double ended plunger. In other aspects, the present technology relates to a plunger for a sausage package dispenser. In still other aspects, the present technology relates to a sausage package dispensing system, device and method for use in connection with controllably dispensing material from a chub or sausage package and more specifically to methods and apparatuses related to hand-held caulking guns that can pierce the sausage package. The present technology can further relate to an adapter system for use in connection with a dispensing device for dispensing material from the sausage package.

Background Description

Material dispensing systems are desirable for providing an ergonomic hand-held device controllably dispensing a material with a desired bead size and shape. The use of caulking or sealing materials to fill gaps between constructions is known. The caulking materials can be utilized indoors and outdoors, and can further be paintable to seamlessly blend between the constructions. There are many different types of caulking materials, along with different types of systems to dispense them.

Squeezable packaging with a nozzle top can be employed to store and then dispense the caulking material. These types of packaging's typically hold a small amount of material, and controlling the dispensing of the material can be difficult.

Hand-held material dispensing devices, such as caulking guns, are well known and generally rely on the action of a piston to push caulk material out of a caulk tube. The motion of the piston is induced by the advancement of a piston rod in the direction of the caulk tube, with the piston rod being advanced in the direction of travel by the operator's squeezing of a trigger.

These known devices are designed to receive and carry a disposable caulk tube. The housing of these caulking guns and the trigger are generally formed of stamped metal plate for manufacturing economy. The caulk tube generally includes a rigid cylindrical tube featuring a sliding piston (plunger), and a nozzle tip, with material stored inside the tube. The caulk tube is commonly more expensive to manufacture than a sausage package because of the different structural elements. While a sausage package is considerably less expensive and easier to manufacture since it is a type of container formed by a tube of flexible packaging material crimped at the ends after filling.

To overcome the disadvantages of caulking tubes, manufacturers developed so called "sausage package" or "chub packs" for the sealant compositions. Sausage packages use less material for the manufacture of the package as compared to caulking tubes, and can be made to be impermeable to air and moisture. They also take up less space in the case package. This allows for a sealant composition stored therein to maintain its consistency and usability and reduce curing of the material. Overall this leads to less waste in both packaging and in preservation of the product in the packaging.

SUMMARY

In view of the foregoing disadvantages inherent in the known types of sausage package dispensing devices now present in the prior art, the present technology provides a novel sausage package dispensing system, and overcomes one or more of the mentioned disadvantages and drawbacks of the prior art. As such, the general purpose of the present technology, which will be described subsequently in greater detail, is to provide a new and novel sausage package dispensing system and method which has all the advantages of the prior art mentioned heretofore and many novel features that result in a sausage package dispensing system which is not anticipated, rendered obvious, suggested, or even implied by the prior art, either alone or in any combination thereof.

According to one aspect, the present technology can include a plunger for dispensing a material. The plunger can include a main wall and a plurality of sectors extending from the main wall. Each of the sectors can include a flange extending from a perimeter edge of the sectors. The sectors adjacent to each other can be separated by a slot.

According to another aspect, the present technology can a plunger for dispensing a material from a collapsible package in a package tube. The plunger can include a main wall and a plurality of sectors extending from the main wall. Each of the sectors can include a flange extending from a perimeter edge of the sectors. The flange can extend away from the perimeter edge at an angle to create a plunger side between the flange of the sectors. The plunger side can be configured to receive an end of a collapsible package containing the material. The sectors adjacent to each other can be separated by a slot defined through the flange and the sectors, respectively. The sectors can be configured to bend in relation to the main wall when a predetermined force is applied to the sectors by the end of the collapsible package.

According to yet another aspect, the present technology can include a method of operating a plunger to dispense a material from collapsible package in a package tube. The plunger can include a main wall and a plurality of sectors extending from the main wall. Each of the sectors can include a flange extending from a perimeter edge of the sectors. The sectors adjacent to each other can be separated by a slot. The method can include the steps of advancing the plunger in the package tube so an end of the collapsible package is received adjacent to the sectors. Forcing the plunger against the end of the collapsible package to create a force applied to at least the flange of the sectors. Bending, by way of the force, the flange of the sectors in relation to the main wall so that at least a perimeter edge of the flange contacts an interior surface of the package tube.

According to yet still another aspect, the present technology can include a system or device for dispensing material contained in a collapsible package from a dispensing device. The system or device can include a piercing nozzle and a plunger. The piercing nozzle can be attachable to a dispensing end of the dispensing device. The piercing nozzle can include a nozzle sidewall and a nozzle end wall defining an internal nozzle cavity configured to receive a first end of the package. One or more recessed members can extend into the internal nozzle cavity. One or more piercing projections can extend in part from the one or more recessed members. The one or more piercing projections can be configured to pierce the package allowing the material in the package to be dispensed when a compression assembly associated with the dispensing device pushes the package towards the piercing nozzle. An internal nozzle rib can extend across a nozzle opening defined through the nozzle end wall. The plunger can include a main wall and a plurality of sectors extending from the main wall. Each of the sectors can include a flange extending from a perimeter edge of the sectors. The sectors adjacent to each other can be separated by a slot.

According to still yet another aspect, the present technology can include an adapter system for dispensing material contained in a collapsible package from a dispensing device. The adapter system can include a piercing nozzle and a plunger. The piercing nozzle can be attachable to a dispensing end of the dispensing device. The piercing nozzle can include one or more piercing projections configured to pierce the collapsible package and allow the material in the collapsible package to be dispensed when a compression assembly associated with the dispensing device pushes the package towards the piercing nozzle. The plunger can be operably associated with a plunger rod of the dispensing device. The plunger can be configured to be slidably receivable in a hollow interior of a package tube and push the collapsible package toward the piercing projections.

According to another aspect, the present technology can include an adapter system for dispensing material contained in a collapsible package from a dispensing device. The adapter system can include a piercing nozzle and a plunger. The piercing nozzle can be attachable to a dispensing end of the dispensing device. The piercing nozzle can include a nozzle sidewall and a nozzle end wall defining an internal nozzle cavity configured to receive a first end of the package. One or more recessed members can extend into the internal nozzle cavity. One or more piercing projections can extend in part from the one or more recessed members. The one or more piercing projections can be configured to pierce the package allowing the material in the package to be dispensed when a compression assembly associated with the dispensing device pushes the package towards the piercing nozzle. An internal nozzle rib can extend across a nozzle opening defined through the nozzle end wall. The plunger can be operably associated with a plunger rod of the dispensing device. The plunger can be configured to be slidably receivable in a hollow interior of a package tube and push the collapsible package toward the piercing projections.

According to yet another aspect, the present technology can include an adapter system for dispensing material contained in a collapsible package from a dispensing device. The adapter system can include a piercing nozzle, a package tube and a plunger. The piercing nozzle can be attachable to a dispensing end of the dispensing device. The piercing nozzle can include a nozzle sidewall and a nozzle end wall defining an internal nozzle cavity configured to receive a first end of the package. One or more recessed members can extend into the internal nozzle cavity. One or more piercing projections can extend in part from the one or more recessed members. The one or more piercing projections can be configured to pierce the package allowing the material in the package to be dispensed when a compression assembly associated with the dispensing device pushes the package towards the piercing nozzle. An internal nozzle rib can extend across a nozzle opening defined through the nozzle end wall. The package tube can define a hollow interior therethrough that can be configured to receive the sausage package therein. The plunger can be operably associated with a plunger rod of the dispensing device. The plunger can include a plunger sidewall featuring a medial point having a width or diameter greater than any other part of the plunger sidewall so that the medial point is in slidable contact with an interior surface of the package tube that defines the hollow interior of the package tube. The plunger can be configured to push the collapsible package toward the piercing projections.

According to still yet another aspect, the present technology can include a system or device for dispensing material contained in a collapsible package from a dispensing device. The system or device can include a piercing nozzle attachable to a dispensing end of the dispensing device. The piercing nozzle can include a nozzle sidewall and a nozzle end wall defining an internal nozzle cavity configured to receive a first end of the package. One or more recessed members can extend into the internal nozzle cavity. One or more piercing projections can extend in part from the one or more recessed members. The one or more piercing projections can be configured to pierce the package allowing the material in the package to be dispensed when a compression assembly associated with the dispensing device pushes the package towards the piercing nozzle. An internal nozzle rib can extend across a nozzle opening defined through the nozzle end wall.

According to yet another aspect, the present technology can include a system for dispensing material contained in a collapsible package from a dispensing device and a plunger attachable to a plunger rod of the dispensing device. The system can include a piercing nozzle attachable to a dispensing end of the dispensing device. The piercing nozzle can include a nozzle sidewall and a nozzle end wall defining an internal nozzle cavity configured to receive a first end of the package. One or more recessed members can extend into the internal nozzle cavity. One or more piercing projections can extend in part from the one or more recessed members. The one or more piercing projections can be configured to pierce the package allowing the material in the package to be dispensed when a compression assembly associated with the dispensing device pushes the package towards the piercing nozzle. An internal nozzle rib can extend across a nozzle opening defined through the nozzle end wall. The plunger can be configured to travel along a longitudinal axis of the dispensing device toward the piercing nozzle to compress the package against the one or more piercing projections.

According to still another aspect, the present technology can include a system for dispensing material contained in a collapsible package from a dispensing device. The system can include a dispensing device, a piercing nozzle and a plunger. The dispensing device can be configured to receive package between a dispensing end and the plunger. The dispensing device can include a plunger rod driving system configured to advance a plunger rod toward a dispensing end. The piercing nozzle can be attachable to the dispensing end of the dispensing device. The piercing nozzle can include a nozzle sidewall and a nozzle end wall defining an internal nozzle cavity configured to receive a first end of the package. One or more recessed members can extend into the internal nozzle cavity. One or more piercing projections can extend in part from the one or more recessed members. The one or more piercing projections can be configured to pierce the package allowing the material in the package to be dispensed when a compression assembly associated with the dispensing device pushes the package towards the piercing nozzle. An internal nozzle rib can extend across a nozzle opening defined through the nozzle end wall. The plunger can be attachable to the plunger rod of the dispensing device. The plunger can be configured to travel along a longitudinal axis of the dispensing device toward the piercing nozzle to compress the package against the one or more piercing projections.

According to yet another aspect, the present technology can include a method of using a system for dispensing material contained in a collapsible package from a dispensing device. The method can include the steps of placing the collapsible package in the dispensing device between a piercing nozzle and a plunger. Moving the plunger to compress a first end of the collapsible package into a nozzle cavity defined in the piercing nozzle and against one or more piercing projections of the piercing nozzle. The nozzle cavity can be defined by a nozzle sidewall and a nozzle end wall of the piercing nozzle. Piercing the first end of the collapsible package by the one or more piercing projections. Comprising the collapsible package to flow the material out from the first end of the collapsible package across an internal nozzle rib and through a nozzle opening defined through the nozzle end wall. The internal nozzle rib extending across the nozzle opening.

In some or all embodiments, the main wall can define a bore therethrough that is operatively engageable with a plunger rod.

In some or all embodiments, the flange can be a first flange extending from the perimeter edge in a first direction to create a first side of the plunger, and a second flange extending from the perimeter edge in a second direction opposite to that of the first direction to create a second side of the plunger.

In some or all embodiments, the first flange can extend away from the perimeter edge at an angle.

In some or all embodiments, the second flange can extend away from the perimeter edge at an angle.

In some or all embodiments, the first flange can extend away from the perimeter edge at a first angle. The second flange can extend away from the perimeter edge at a second angle. The first angle can be equal to the second angle, or the first angle can be different to the second angle.

In some or all embodiments, the slot can be defined through the flange and the sectors, respectively.

In some or all embodiments, the slot can have a width that increases from the first side to the second side.

In some or all embodiments, the sectors can be configured to bend in relation to the main wall when a predetermined force is applied to the sectors.

In some or all embodiments, the flange can have a perimeter edge configured to contact an internal wall of a package tube when the plunger is received in the package tube.

In some or all embodiments, the flange can be configured to deform upon application of the predetermined force to provide a surface area that contacts the internal wall of the package tube in combination with the perimeter edge.

In some or all embodiments, the plunger can be configured to slide in the package tube of a dispensing device and to contact an end of a collapsible package contained in the package tube.

Some or all embodiments of the present technology can include a central hub defining a rod bore therethrough. The main wall can extend from the central hub.

Some or all embodiments of the present technology can include a fastener receiving member extending from the central hub, the fastener receiving member defines a fastener head receiving cavity that is in communication with the rod bore. A fastener secures the plunger to a plunger rod.

In some or all embodiments, the piercing nozzle can include a nozzle sidewall, a nozzle end wall, one or more recessed members and an internal rib. The nozzle sidewall and the nozzle end wall can define an internal nozzle cavity configured to receive a first end of the package. The recessed members can extend into the internal nozzle cavity, with the one or more piercing projections extending in part from the one or more recessed members. The internal nozzle rib can extend across a nozzle opening defined through the nozzle end wall.

In some or all embodiments, the piercing nozzle can further include a male portion defining a male portion bore defined therethrough and in communication with the nozzle opening.

In some or all embodiments, the one or more piercing projections cam include two or more piercing walls angularly oriented with each other to form a V-shape.

In some or all embodiments, the piercing walls can each include an angled edge that converge to form a piercing tip.

In some or all embodiments, the one or more recessed members can each include a pair of opposed recessed member sidewalls, one or more recessed member end walls and a recessed member bottom wall. The piercing walls can extend from any one of or any combination of the recessed member sidewalls, the one or more recessed member end walls and the recessed member bottom wall.

In some or all embodiments, the internal nozzle rib can connect between the one or more piercing projections.

In some or all embodiments, the internal nozzle rib can include a central portion that can extend across the nozzle opening, and a piercing projection portion that can extend at an angle from opposite ends of the central portion toward and connecting to at least one of the one or more piercing projections.

Some or all embodiments of the present technology can include a plunger attachable to a plunger rod of the dispensing device and configured to travel along a longitudinal axis of the dispensing device toward the piercing nozzle to compress the package against the one or more piercing projections.

In some or all embodiments, the plunger can include a plunger sidewall and a plunger base wall defining a plunger cavity. The plunger cavity can be configured to receive a second end of the package.

In some or all embodiments, the plunger can include multiple plunger protrusions each including plunger protrusion walls extending from the plunger base wall into the plunger cavity. The plunger protrusion walls and the plunger base wall can define a plunger protrusion cavity in communication with the plunger cavity.

In some or all embodiments, the plunger protrusion walls can have a length from the plunger base wall greater than a length of the nozzle sidewall from the plunger base wall.

In some or all embodiments, the plunger sidewall can include an interior side in part defining the plunger cavity and an angled exterior side creating a first thickness of a free end of the plunger sidewall less than a second thickness of the plunger sidewall adjacent the plunger base wall.

In some or all embodiments, the plunger sidewall of the first plunger section and the second plunger section can meet at an exterior medial point that is wider than a free end of the plunger sidewall, respectively. The medial point can slidably contact an interior surface of the package tube that defines the hollow interior of the package tube.

In some or all embodiments, the plunger can include a plunger sidewall featuring a medial point having a width or diameter greater than any other part of the plunger sidewall so that the medial point is in slidable contact with an interior surface of the package tube that defines the hollow interior of the package tube.

In some or all embodiments, the plunger can include a second plunger sidewall inverted to and extending from the plunger sidewall. The plunger can further include second plunger protrusions inverted to the plunger protrusions and extending from the plunger base wall.

In some or all embodiments, the plunger protrusion walls can be configured to form the plunger protrusions in a geometric shape.

In some or all embodiments, the plunger rod can include a plunger adapter including male protrusions that can be configured to be receivable in an open space defined in the plunger protrusions of the plunger.

In some or all embodiments, the piercing nozzle and/or the plunger can be integrally formed with the dispensing device.

In some or all embodiments, the piercing nozzle and/or the plunger can be removably attachable to the dispensing device.

There has thus been outlined, rather broadly, features of the present technology in order that the detailed description thereof that follows may be better understood and in order that the present contribution to the art may be better appreciated.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

It is therefore an object of the present technology to provide a new and novel sausage package dispensing system that has all of the advantages of the prior art sealant dispensing systems and none of the disadvantages.

It is another object of the present technology to provide a new and novel sausage package dispensing system that may be easily and efficiently manufactured and marketed.

An even further object of the present technology is to provide a new and novel sausage package dispensing system that has a low cost of manufacture with regard to both materials and labor, and which accordingly is then susceptible of low prices of sale to the consuming public, thereby making such sausage package dispensing system economically available to the buying public.

Still another object of the present technology is to provide a new sausage package dispensing system that provides in the apparatuses and methods of the prior art some of the advantages thereof, while simultaneously overcoming some of the disadvantages normally associated therewith.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology. Whilst multiple objects of the present technology have been identified herein, it will be understood that the claimed present technology is not limited to meeting most or all of the objects identified and that some embodiments of the present technology may meet only one such object or none at all.

BRIEF DESCRIPTION OF THE DRAWINGS

The present technology will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE EMBODIMENTS

Figure 1:
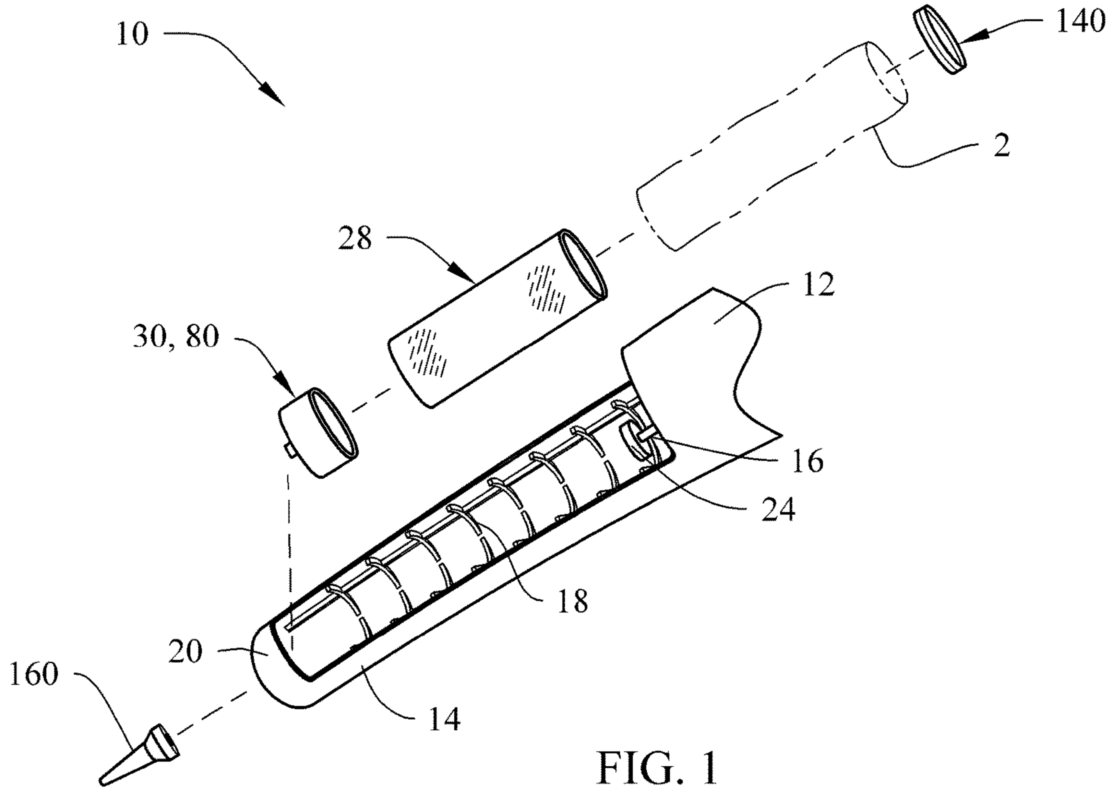
FIG. 1 is an exploded rear-right perspective view of an embodiment of the sausage package dispensing system constructed in accordance with the principles of the present invention and utilized with a caulking gun, with the phantom lines depicting environmental structure and forming no part of the claimed invention.

Apart from the cumbersomeness of known sausage package dispensers utilizing plungers, they are not easily capable of providing sufficient sealing against the internal wall of the package tube of the dispenser, thereby preventing leakage of material in the chub or sausage package past the plunger.

While the above-described devices fulfill their respective, particular objectives and requirements, the aforementioned devices or systems do not describe a plunger that allows controllably dispensing material while prevent leakage.

A need exists for a new and novel plunger that prevents leakage and that can be utilized with a sausage package dispensing system. In this regard, the present technology substantially fulfills this need. In this respect, the sausage package dispensing system according to the present technology substantially departs from the conventional concepts and designs of the prior art, and in doing so provides an apparatus primarily developed for the purpose of controllably dispensing material from a sausage package.

In the following description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

Referring now to the drawings, and particularly to FIGS. 1-26, a new and novel sausage package dispensing system or device and a plunger are provided according to some embodiments.

Figure 2:
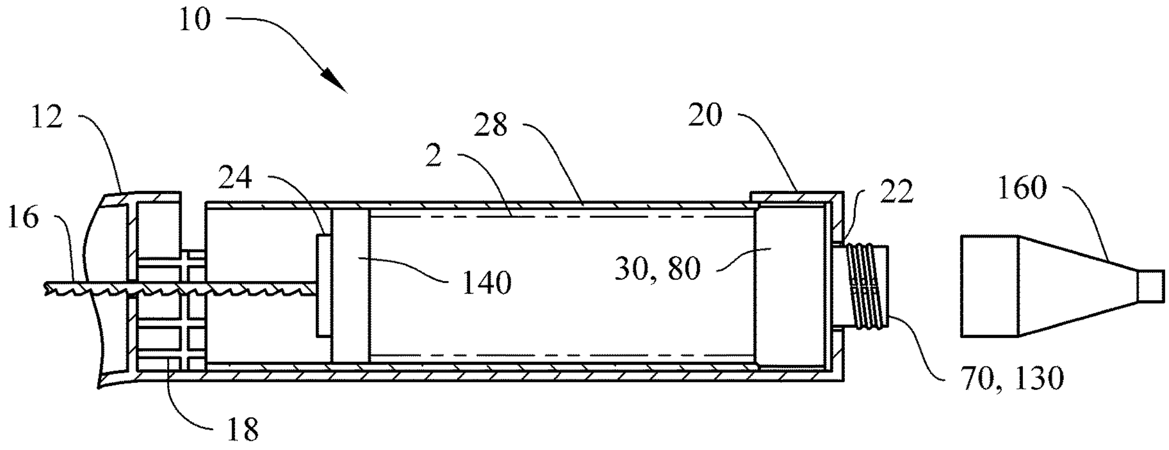
FIG. 2 is a cross-sectional view of the caulking gun utilizing the sausage package dispensing system of the present technology.

In FIGS. 1 and 2, a new and novel sausage package dispensing system or device 10 of the present technology for controllably dispensing material from a collapsible package or sausage package 2 is illustrated and will be described. More particularly, the sausage package dispensing system 10 can be associated with a sausage dispensing device 12 configured to receive a collapsible package or sausage package 2, a package tube 28, a piercing nozzle 30, 80, and a plunger 140. The package tube 28, the piercing nozzle 30, 80, and the plunger 140 can be provided together as an adapter system to the dispensing device 12, or can be provided separately, or can be provided with the dispensing device 12 as a single unit.

It can be appreciated that the sausage package 2 can include any cylindrically-shaped or sausage-shaped casing package that is collapsible and contains an extrudable material therein. In the exemplary the extrudable material can be, but not limited to, a sealant, grease, a lubricant, food materials, a caulking, a paste, mixable compounds, a filler and the like.

Many advantages come with packaging adhesive and sealant products in the sausage package 2. A first advantage is that the sausage package 2 itself represents an initial cost savings compared to a conventional cartridge or tubes in manufacturing. As the cost in manufacturing the sausage package is substantially less than manufacturing a conventional cartridge or tube.

Another advantage is the extended shelf life of the material in the sausage package 2. Sausage packaging uses a flat film that is then formed into a sausage and clipped or sealed with product material stored therein. As a result, no air is introduced during the filling process. The film used to form the sausage package 2 also provides an excellent moisture barrier, such as multi-layered film with a trapped aluminum.

Still another advantage is the increased space savings for storing in warehouses, on store shelves, during transportation or carrying by a user to a job site or location.

Another key benefit of the sausage package 2 is lower disposal costs. Since an empty sausage package is basically a small, compressed, foil disc that is 10% the size of a typical empty cartridge or tube, disposal cost savings can be high. In addition, the sausage package 2 can result in less waste going to the landfill, which is a key component in environmental sustainability.

The present technology provides efficient dispensing of the material in the sausage package 2 by utilizing aftermarket components that can be easily used with existing caulking guns or can be an all in one caulking gun or dispensing device including the components of the present technology.

For exemplary purposes, the sausage dispensing device 12 can have a configuration similar to a gun featuring a main housing 14, a plunger rod 16, an internal cavity featuring reinforcing ribs 18, and a dispensing end section 20. A hand grip, a trigger and a piston grip can be utilized with the dispensing device 12. It can be appreciated that the plunger rod 16 of the dispensing device 12 can be manually driven via a rack or ratcheting system or via a motor and gear system. The main housing 14 can be made of, but not limited to, plastic, metal, composite, an alloy or any combination thereof. The dispensing device 12 can be a single molded unit or can be made of separable and attachable sections secured together by, but not limited to, adhesive, welding, fasteners, tabs, locks, clips or other securing means.

The internal cavity of the main housing 14 can be configured to receive the sausage package 2 directly or receive the package tube 28 with the sausage package 2 located inside the package tube 28. Reinforcing ribs 18 can be configured to provide rigidity to the dispensing device 12, to support the package tube 28 received in the main housing 14 and/or to assisting in containing or guiding the sausage package 2 while contained in the internal cavity.

The package tube 28 can be a hollow tube with opposite open ends thereby allowing reception of the sausage package 2 inside the package tube 28 from either end. A width or diameter of the package tube 28 can be sized to be received in a caulking gun or the internal cavity of the main housing 14 of the dispensing device 12. The package tube 28 can be made out of any suitable material such as, but not limited to, plastic, metal, alloys, cardboard and the like. Further, the package tube 28 can be transparent or include a window or opening to easily view the sausage package 2 inside the package tube 28. It can be appreciated that the package tube 28 can include ribs or grooves to increase rigidity of the package tube 28 and/or to prevent bending or expansion of the package tube 28 during use.

The plunger 140 can be configured to be attachable to the plunger rod 16 or a part associated therewith, and can be further configured to be slidably raceable within the package tube 28. Alternatively, the plunger 140 can be configured to be slidably receivable along a longitudinal axis of the internal cavity of the main housing 14 so that it can be used without the package tube 28.

The dispensing end section 20 can be configured to receive the piercing nozzle 30, 80 therein so that at a male portion 70, 130 of the piercing nozzle 30, 80 can be inserted through a dispensing end opening 22 defined through the dispensing end section 20 of the dispensing device 12.

A nozzle tip 160 can be attachable to the male portion 70, 130 of the piercing nozzle 30, 80 thereby securing the piercing nozzle 30, 80 to the dispensing end section 20, as best illustrated in FIG. 2. The nozzle tip 160 can be configured to assist in dispensing and/or spreading material dispensed from the sausage package 2 onto a surface or into a gap. The nozzle tip 160 can be made of, but not limited to, plastic, metal, composite, an alloy or any combination thereof.

With reference to FIGS. 3-7, an embodiment of the piercing nozzle 30 is illustrated and will be described. The piercing nozzle 30 can be removably attachable to or integrally formed with the dispensing end section 20. The piercing nozzle 30 can include a housing featuring a nozzle sidewall 32 defining a nozzle cavity 34 therein configured to receive an end of the sausage package 2. The piercing nozzle 30 can be made of, but not limited to, plastic, metal, composite, an alloy or any combination thereof.

A width or diameter of the sidewall 32 can be substantially the same as the width or diameter of the package tube 28, so that they contact each other during use and allowing the end of the sausage package 2 to easily travel through the open end of the package tube 28 and into the nozzle cavity 34. Alternatively, the width or diameter of the sidewall 32 can be greater than the width or diameter of the package tube 28 thereby allowing either end of the package tube 28 to be received in the nozzle cavity 34. In another alternative, the width or diameter of the sidewall 32 can be less than the width or diameter of the package tube 28 thereby allowing the sidewall 32 portion of the piercing nozzle 30 to be received in at least a portion of the hollow interior of the package tube 28.

A ledge 36 can extending from a perimeter of the nozzle sidewall 32 at a location where the nozzle sidewall 32 transitions to a nozzle end wall 38. The ledge 36 can have a width or diameter greater than nozzle sidewall 32. The ledge 36 can be configured to prevent the piercing nozzle 30 from being completely inserted into the hollow interior of the package tube 28.

An angled or curved section 40 can transition from the ledge 36 to the nozzle end wall 38. The section 40 can be indented toward the nozzle cavity 34, thereby creating a recessed spaced in relation to the ledge 36 and the nozzle end wall 38. A nozzle opening 41 can be centrally defined through the nozzle end wall 38 and configured to allow material from the sausage package 2 to pass therethrough.

The male portion 70 can extend from the nozzle end wall 38 in a direction away from the nozzle sidewall 32. The male portion 70 can defined a longitudinal male portion bore 72 therethrough, and can include external threads 74. The male portion bore 72 is in direct fluid communication with the nozzle opening 41, thereby allowing material from the sausage package 2 to be received from the nozzle opening 41 and exit the male portion 70. Further, the male portion bore 72 can convergingly taper in a direction toward the nozzle end wall 38 so that a first width or diameter of the male portion bore 72 adjacent the nozzle opening 41 is less than a second width or diameter of an exit end of the male portion bore 72 opposite the nozzle opening 41.

It can be appreciated that the male portion 70 can be integrally formed with and extending out from the dispensing end section 20.

Figure 7:
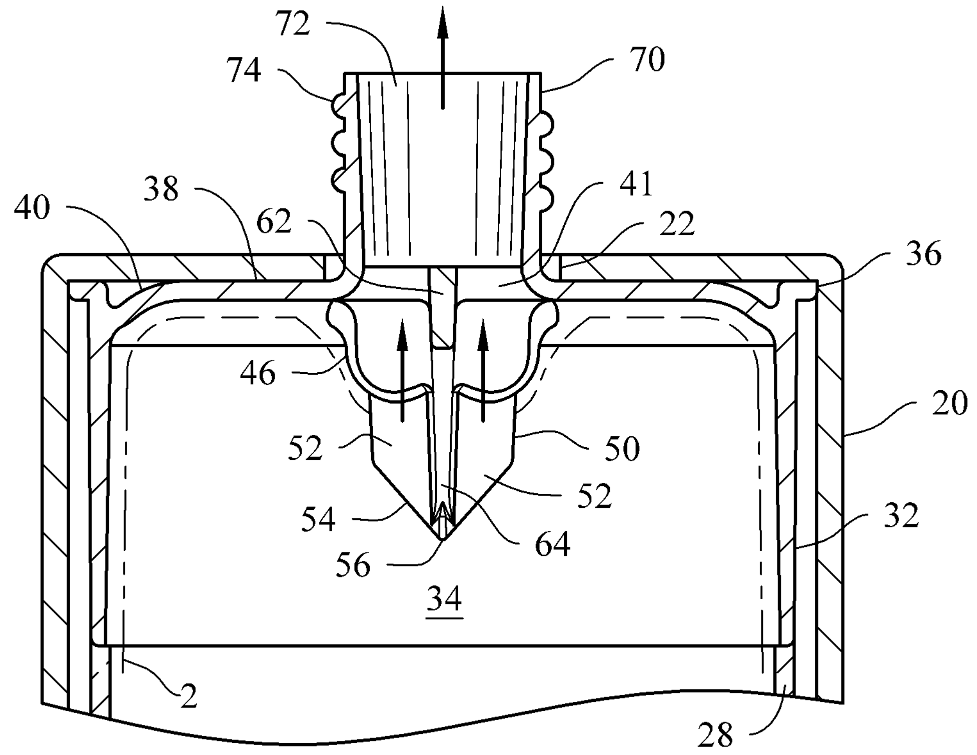
FIG. 7 is a cross-sectional view of the piercing nozzle taken along line 7-7 in FIG. 5 showing the support member and the nozzle openings.

A width or diameter of the male portion 70 including the external threads 74 can be configured to be inserted through the dispensing end opening 22, as best illustrated in FIG. 7. It can be appreciated that the dispensing end opening 22 is configured to prevent the housing of the piercing nozzle 30 from passing therethrough. When the piercing nozzle 30 is assembled in the dispensing end section 20, the ledge 36 and/or the nozzle end wall 38 can abut or contact an end wall of the dispensing end section 20 that includes the dispensing end opening 22.

The nozzle tip 160 can include an attachment end configured to secure the nozzle tip 160 to the male portion 70. This can be accomplished, but not limited to, by utilizing internal threads of the nozzle tip 160 that are engageable with the external threads 74 of the male portion 70. It can be appreciated that other securing mechanisms can be utilized instead of threads such as, but not limited to, ratchets, clips, latches, locks or magnets. The width or diameter of the attachment end of the nozzle tip 160 can be greater than the dispensing end opening 22, thereby clamping the piercing nozzle 30 to the end wall of the dispensing end section 20 when the nozzle tip 160 is secured to the male portion 70.

Figure 3:
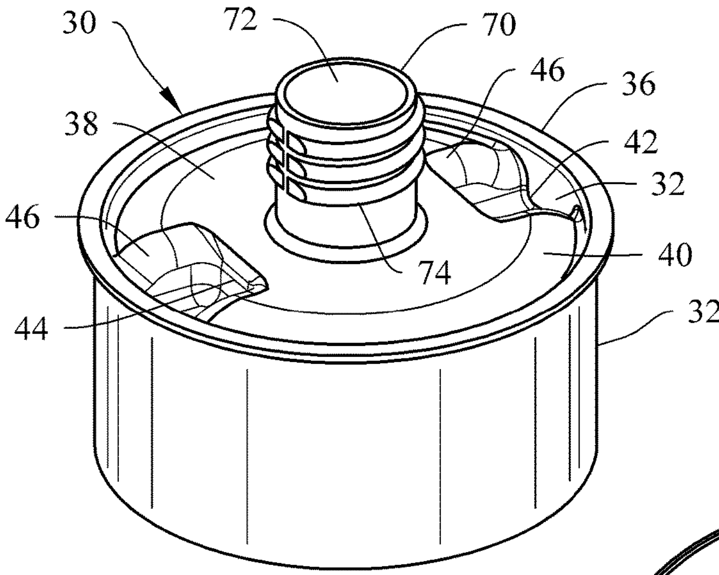
FIG. 3 is a top-right perspective view of the piercing nozzle of the sausage package dispensing system of the present technology.
Figure 4:
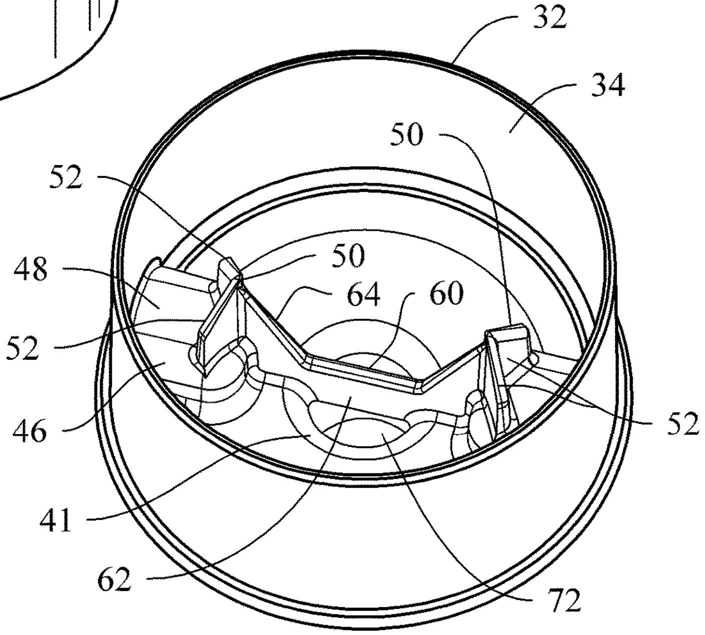
FIG. 4 is a bottom-left perspective view of the piercing nozzle of the sausage package dispensing system of the present technology.
Figure 5:
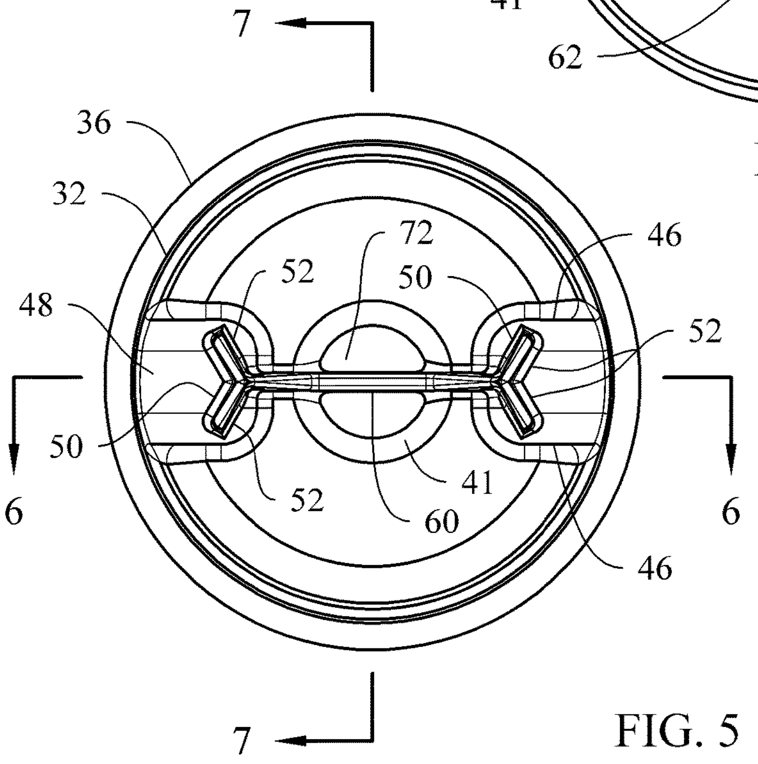
FIG. 5 is a bottom elevational view of the piercing nozzle of the sausage package dispensing system of the present technology.
Figure 6:
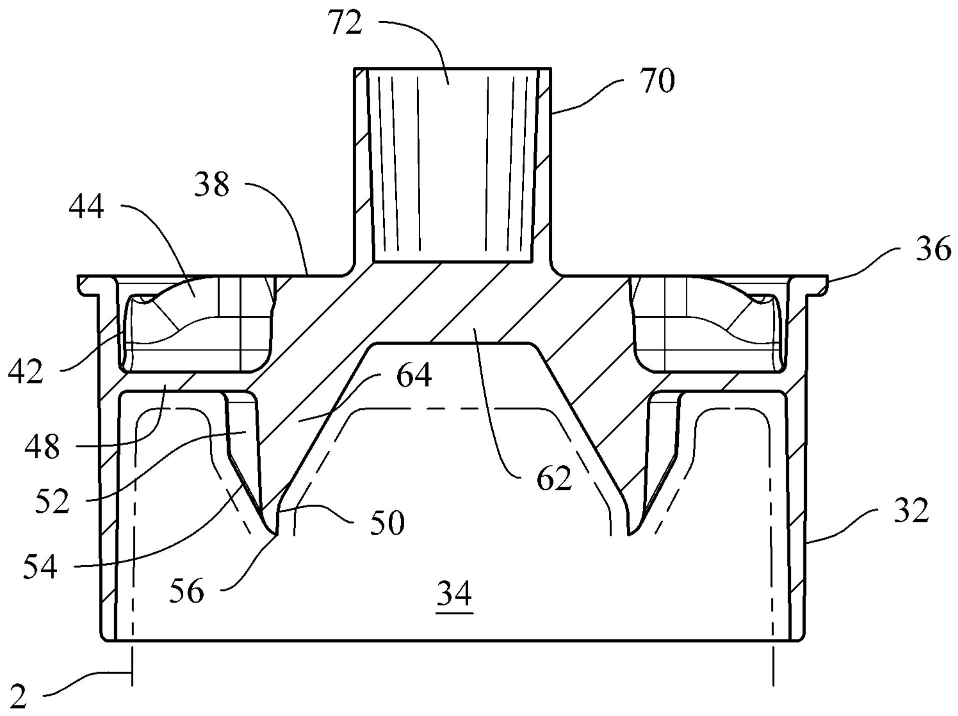
FIG. 6 is a cross-sectional view of the piercing nozzle taken along line 6-6 in FIG. 5 showing the piercing members puncturing the sausage package.

One or more recessed members 42 can extend from the nozzle end wall 38 and/or the curved section 40 and into the nozzle cavity 34. The recessed members 42 can include a recessed member end wall 44, recessed member sidewalls 46 and a recessed member bottom wall 48, thereby defining a recessed cavity. The recessed cavity can in part be further defined by the nozzle sidewall 32 of the housing, as best illustrated in FIGS. 3 and 6. In the exemplary, the piercing nozzle 30 can include two recessed members 42 located opposite each other with the male portion 70 located therebetween. It can be appreciated that any number of recessed members 42 can be utilized with the present technology.

One or more piercing projections 50, as best illustrated in FIGS. 4-7, can extend from the recessed member sidewalls 46 and/or the recessed member bottom wall 48 of each of the recessed members 42 and into the nozzle cavity 34. In the exemplary, the piercing projections 50 can include two or more piercing walls 52 that extend from the recessed member sidewalls 46 and/or the recessed member bottom wall 48. The piercing walls 52 can be at an angular orientation with each other forming a generally V-shape when viewing into the nozzle cavity 34. An internal angle between the piercing walls 52 can be less than 180°. Further, the converging angle of each of the piercing projections 50 can be facing each other so that an opened portion of the V-shape faces the nozzle sidewall 32.

Each of the piercing walls 52 can include an angled edge 54 that converge toward each other to form a piercing tip 56 of the piercing projections 50. The piercing tip 56 can be configured to easily pierce or puncture a casing of the sausage package 2 when pressed thereagainst.

In the exemplary, the recessed members 42 and/or the piercing projections 50 can be configured to not extend into or obstruct the longitudinal male portion bore 72 of the male portion 70, thereby creating a clear path for material to pass or travel through.

An internal rib 60 can extend between the piercing projections 50 passing over the nozzle opening 41. The internal rib 60 can include a middle portion 62 that extends over the nozzle opening 41, thereby dividing the nozzle opening 41 into two opposite areas. The internal rib 60 can further include a piercing projection portion 64 that extends at an angle from opposite ends of the middle portion 62 toward the piercing tip 56 of each of the piercing projections 50. The piercing projection portion 64 can meet the piercing projections 50 either directly at the piercing tip 56, or adjacent thereto or offset therefrom to make a separation from the piercing tip 56, as best illustrated in FIG. 6. This separation can be configured to assist in separating a pierced portion of the casing of the sausage package 2 away from the remaining portion of the sausage package 2. Such a separation can allow for the creation of a larger pierced opening in the sausage package 2, thereby providing easier flow of material out from the sausage package 2 when the dispensing device 12 is operated.

At least one channel can be defined along a longitudinal axis of each of the piercing projections 50 and/or the piercing projection portion 64 of the internal rib 60. Further, the channel can be defined as the open area between each of the piercing walls 52 and the piercing projection portion 64. The channel can be in communication with the nozzle opening 41. Once the sausage package 2 is punctured by the piercing projections 50, the piercing projections 50 are inserted/received into the interior of the sausage package 2 so that any material in the sausage package 2 is allowed to flow through the channel and into the nozzle opening 41, and then into the male portion bore 72.

The internal rib 60 can further provide structural support for the piercing nozzle 30 and/or resist against collapsing of the nozzle sidewall 32. Still further, the internal rib 60 can assist in guiding the end of the sausage package 2 toward the piercing projections 50 and/or preventing the pierced portion of the casing of the sausage package 2 from entering or obstructing the nozzle opening 41 and/or the male portion bore 72, as best illustrated in FIG. 7 with the flow of material being represented by arrows.

It can be appreciated that the nozzle sidewall 32, the piercing projections 50, the internal rib 60 and the male portion 70 can be integrally formed to create the piercing nozzle 30.

With reference to FIGS. 8-12, an embodiment of the piercing nozzle 80 is illustrated and will be described, which is similar to the embodiment illustrated in FIGS. 3-7 and as described above. The piercing nozzle 80 can be removably attachable to or integrally formed with the dispensing end section 20. The piercing nozzle 80 can include a housing featuring a nozzle sidewall 82 defining a nozzle cavity 84 therein configured to receive an end of the sausage package 2. The piercing nozzle 80 can be made of, but not limited to, plastic, metal, composite, an alloy or any combination thereof.

A width or diameter of the sidewall 82 can be substantially the same as the width or diameter of the package tube 28, so that they contact each other during use and allowing the end of the sausage package 2 to easily travel through the open end of the package tube 28 and into the nozzle cavity 84. Alternatively, the width or diameter of the sidewall 82 can be greater than the width or diameter of the package tube 28 thereby allowing either end of the package tube 28 to be received in the nozzle cavity 84. In another alternative, the width or diameter of the sidewall 82 can be less than the width or diameter of the package tube 28 thereby allowing the sidewall 82 portion of the piercing nozzle 80 to be received in at least a portion of the hollow interior of the package tube 28.

A ledge 86 can extend from a perimeter of the nozzle sidewall 82 at a location where the nozzle sidewall 82 transitions to a nozzle end wall 88. The ledge 86 can have a width or diameter greater than nozzle sidewall 82. The ledge 86 can be configured to prevent the piercing nozzle 80 from being completely inserted into the hollow interior of the package tube 28.

The nozzle end wall 88 can be planar extending to the ledge 86. A nozzle opening 89 can be centrally defined through the nozzle end wall 88 and configured to allow material from the sausage package 2 to pass therethrough.

The male portion 130 can extend from the nozzle end wall 88 in a direction away from the nozzle sidewall 82. The male portion 130 can defined a longitudinal male portion bore 132 therethrough, and can include external threads 134. The male portion bore 132 is in direct fluid communication with the nozzle opening 89, thereby allowing material from the sausage package 2 to be received from the nozzle opening 89 and exit the male portion 130. Further, the male portion bore 132 can convergingly taper in a direction toward the nozzle end wall 88 so that a first width or diameter of the male portion bore 132 adjacent the nozzle opening 89 is less than a second width or diameter of an exit end of the male portion bore 132 opposite the nozzle opening 89.

Figure 12:
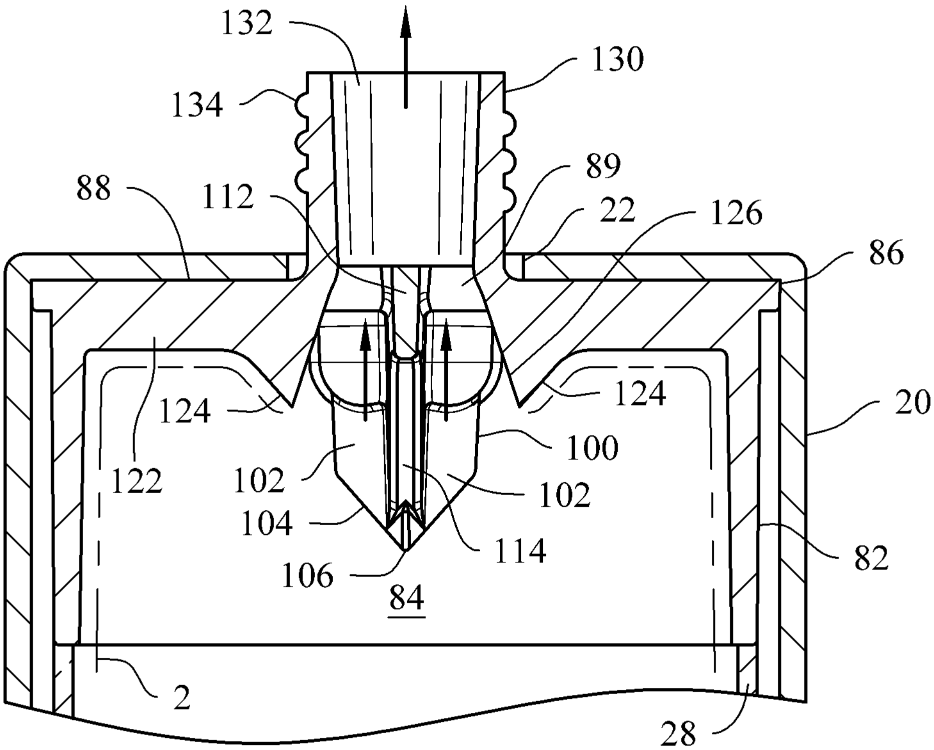
FIG. 12 is a cross-sectional view of the alternate embodiment piercing nozzle taken along line 12-12 in FIG. 10 showing the support member, the nozzle openings and the secondary piercing members puncturing the sausage package.

A width or diameter of the male portion 130 including the external threads 134 can be configured to be inserted through the dispensing end opening 22, as best illustrated in FIG. 12. It can be appreciated that the dispensing end opening 22 is configured to prevent the housing of the piercing nozzle 80 from passing therethrough. When the piercing nozzle 80 is assembled in the dispensing end section 20, the ledge 86 and/or the nozzle end wall 88 can abut or contact an end wall of the dispensing end section 20 that includes the dispensing end opening 22.

The nozzle tip 160 can include an attachment end configured to secure the nozzle tip 160 to the male portion 130. This can be accomplished, but not limited to, by utilizing internal threads of the nozzle tip 160 that are engageable with the external threads 134 of the male portion 130. It can be appreciated that other securing mechanisms can be utilized instead of threads such as, but not limited to, ratchets, clips, latches, locks or magnets. The width or diameter of the attachment end of the nozzle tip 160 can be greater than the dispensing end opening 22, thereby clamping the piercing nozzle 80 to the end wall of the dispensing end section 20 when the nozzle tip 160 is secured to the male portion 130.

Figure 8:
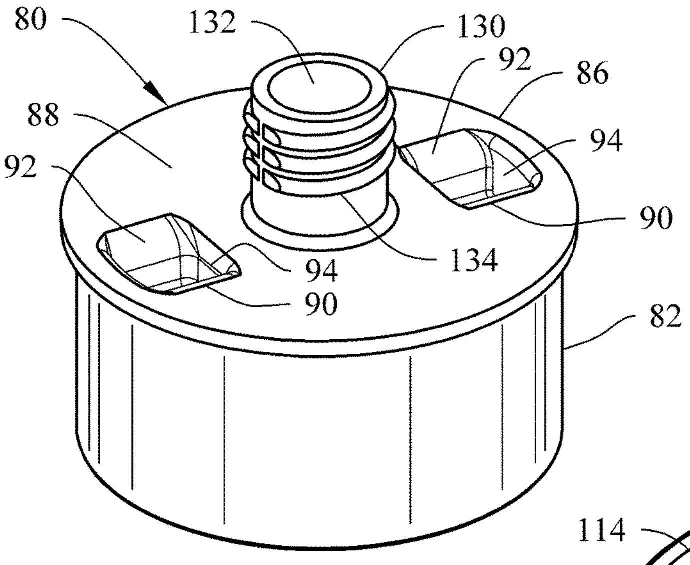
FIG. 8 is a top-right perspective view of the alternate embodiment piercing nozzle of the sausage package dispensing system of the present technology.
Figure 9:
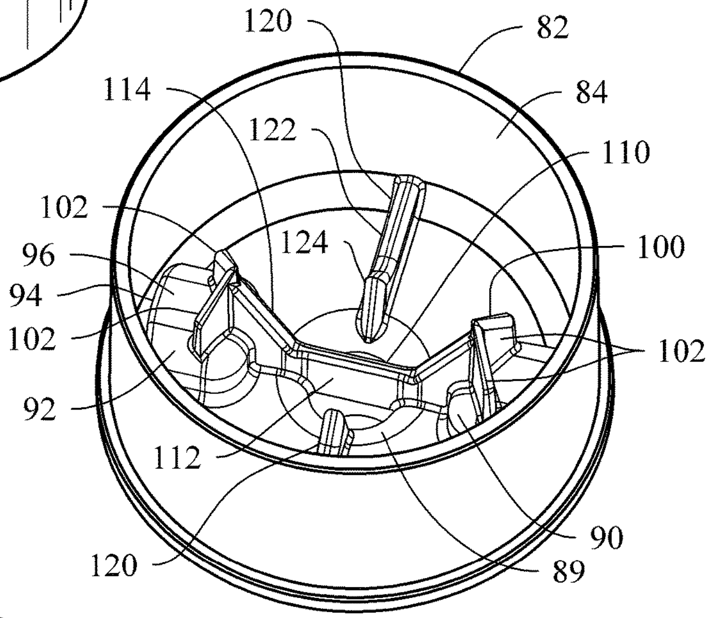
FIG. 9 is a bottom-left perspective view of the alternate embodiment piercing nozzle of the sausage package dispensing system of the present technology.
Figure 10:
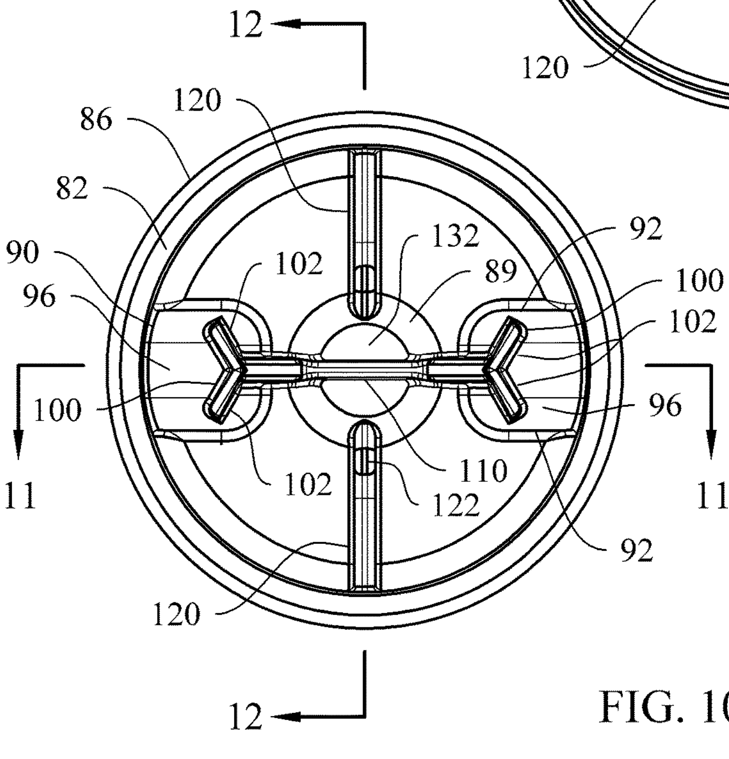
FIG. 10 is a bottom elevational view of the alternate embodiment piercing nozzle of the sausage package dispensing system of the present technology.

One or more recessed members 90 can extend from the nozzle end wall 88 and into the nozzle cavity 84. The recessed members 90 can include opposed recessed member sidewalls 92, opposed recessed member end walls 94 and a recessed member bottom wall 96, thereby defining a recessed cavity. The recessed members 90 can be offset from the nozzle sidewall 82 to provide a portion of the nozzle end wall 88 between the recessed members 90 and the ledge 86, as best illustrated in FIG. 8. In the exemplary, the piercing nozzle 80 can include two recessed members 90 located opposite each other with the male portion 130 located therebetween. It can be appreciated that any number of recessed members 90 can be utilized with the present technology.

One or more piercing projections 100, as best illustrated in FIGS. 9-12, can extend from one of the recessed member sidewalls 92, one or more of the recessed member end walls 94 and/or the recessed member bottom wall 96 of each of the recessed members 90 and into the nozzle cavity 84. In the exemplary, the piercing projections 100 can include a two or more piercing walls 102 that extend from one of the recessed member sidewalls 92, one or more of the recessed member end walls 94 and/or the recessed member bottom wall 96. The piercing walls 102 can be at an angular orientation with each other forming a generally V-shape when viewing into the nozzle cavity 84. An internal angle between the piercing walls 52 can be less than 180°. Further, the converging angle of each of the piercing projections 100 can be facing each other so that an opened portion of the V-shape faces the nozzle sidewall 82.

Each of the piercing walls 102 can include an angled edge 104 that converge toward each other to form a piercing tip 106 of the piercing projections 100. The piercing tip 106 can be configured to easily pierce or puncture a casing of the sausage package 2 when pressed thereagainst.

In the exemplary, the recessed members 90 and/or the piercing projections 100 can be configure to not extend into or obstruct the longitudinal male portion bore 132 of the male portion 130, thereby creating a clear path for material to pass or travel through.

Figure 11:
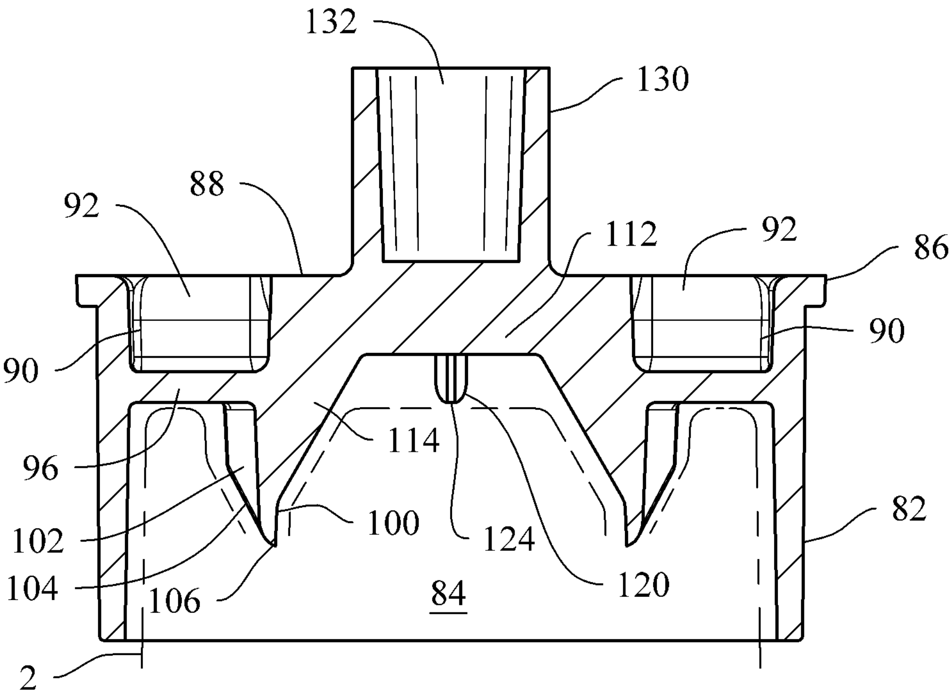
FIG. 11 is a cross-sectional view of the alternate embodiment piercing nozzle taken along line 11-11 in FIG. 10 showing the piercing members puncturing the sausage package.

An internal rib 110 can extend between the piercing projections 100 passing over the nozzle opening 89. The internal rib 110 can include a central portion 112 that extends over the nozzle opening 89, thereby dividing the nozzle opening 89 into two opposite areas. The internal rib 110 can further include a piercing projection portion 114 that extends at an angle from opposite ends of the central portion 112 toward the piercing tip 106 of each of the piercing projections 100. The piercing projection portion 114 can meet the piercing projections 100 either directly at the piercing tip 106, or adjacent thereto or offset therefrom to make a separation from the piercing tip 106, as best illustrated in FIG. 11. This separation can be configured to assist in separating a pierced portion of the casing of the sausage package 2 away from the remaining portion of the sausage package 2. Such a separation can allow for the creation of a larger pierced opening in the sausage package 2, thereby providing easier flow of material out from the sausage package 2 when the dispensing device 12 is operated.

At least one channel can be defined along a longitudinal axis of each of the piercing projections 100 and/or the piercing projection portion 114 of the internal rib 110. Further, the channel can be defined as the open area between each of the piercing walls 102 and the piercing projection portion 114. The channel can be in communication with the nozzle opening 89. Once the sausage package 2 is punctured by the piercing projections 100, the piercing projections 100 are inserted/received into the interior of the sausage package 2 so that any material in the sausage package 2 is allowed to flow through the channel and into the nozzle opening 89, and then into the male portion bore 132.

The internal rib 110 can further provide structural support for the piercing nozzle 80 and/or resist against collapsing of the nozzle sidewall 82. Still further, the internal rib 110 can assist in guiding the end of the sausage package 2 toward the piercing projections 100 and/or preventing the pierced portion of the casing of the sausage package 2 from entering or obstructing the nozzle opening 89 and/or the male portion bore 132, as best illustrated in FIG. 7 with the flow of material being represented by arrows.

One or more secondary piercing members 120 can extend from the nozzle end wall 88 and/or the nozzle sidewall 82 into the nozzle cavity 84. The secondary piercing members 120 can be located in a spaced apart relationship between the recessed members 90 and/or between the piercing projections 100. The secondary piercing members 120 can each include an internal rib section 122 and a puncture tooth 124 pointing in a direction away from the nozzle end wall 88 and into the nozzle cavity 84. The secondary piercing members 120 can be configured to not obstruct the flow of material into the male portion bore 132.

The secondary piercing members 120 or any portion thereof can be configured to provide additional strength and/or rigidity to the piercing nozzle 80 during use. Collapsing of the nozzle sidewall 82 and/or the nozzle end wall 88 can be reduced by configuring a width, a height and/or a location of the internal rib section 122 or any portion of the secondary piercing members 120.

The puncture tooth 124 can have a first wall or edge extending at an angle from the internal rib section 122 and a second wall or edge 126 extending at an angle from the nozzle end wall 88, an area of the nozzle end wall 88 that in part defines the nozzle opening 89 or an end of the male portion 130 adjacent to the nozzle opening 89. The angle of the first edge and the second edge 126 converge to form the puncture tooth 124.

The puncture tooth 124 can be configured to further puncture the sausage package 2 in combination with the piercing tip 106 to create a larger opening in the sausage package 2, thereby allowing material to flow more easily from the sausage package 2, as best illustrated in FIG. 12

The piercing nozzle 80 can include any number of the secondary piercing members 120 radially arranged about a longitudinal axis of the piercing nozzle 80 or the male portion bore 132.

It can be appreciated that the nozzle sidewall 82, the piercing projections 100, the internal rib 110, the secondary piercing members 120 and the male portion 130 can be integrally formed to create the piercing nozzle 80.

Figure 13:
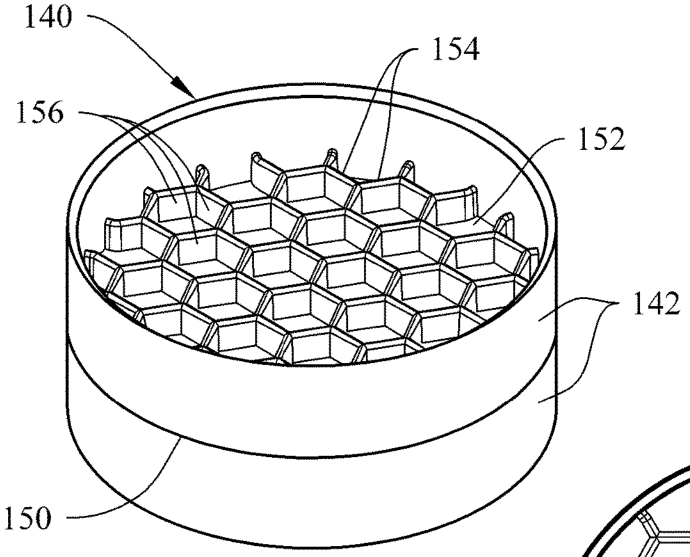
FIG. 13 is a top-right perspective view of the plunger of the sausage package dispensing system of the present technology.
Figure 14:
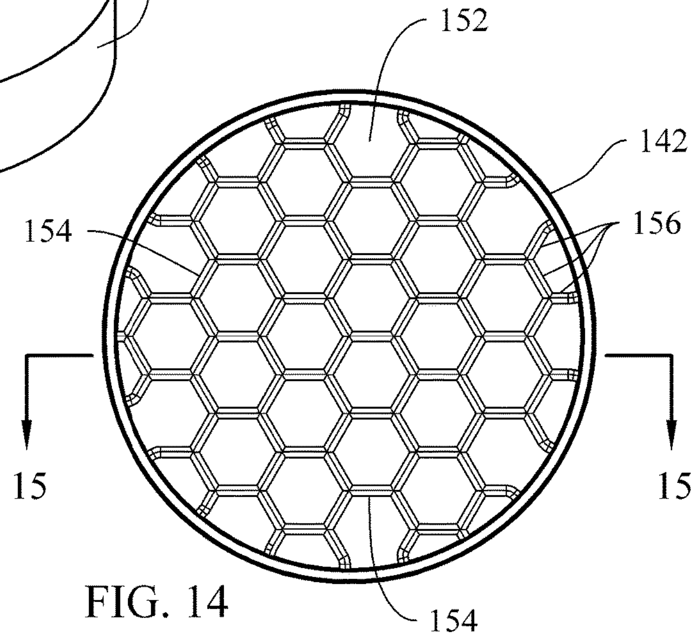
FIG. 14 is a top elevational view of the plunger of the sausage package dispensing system of the present technology.
Figure 15:
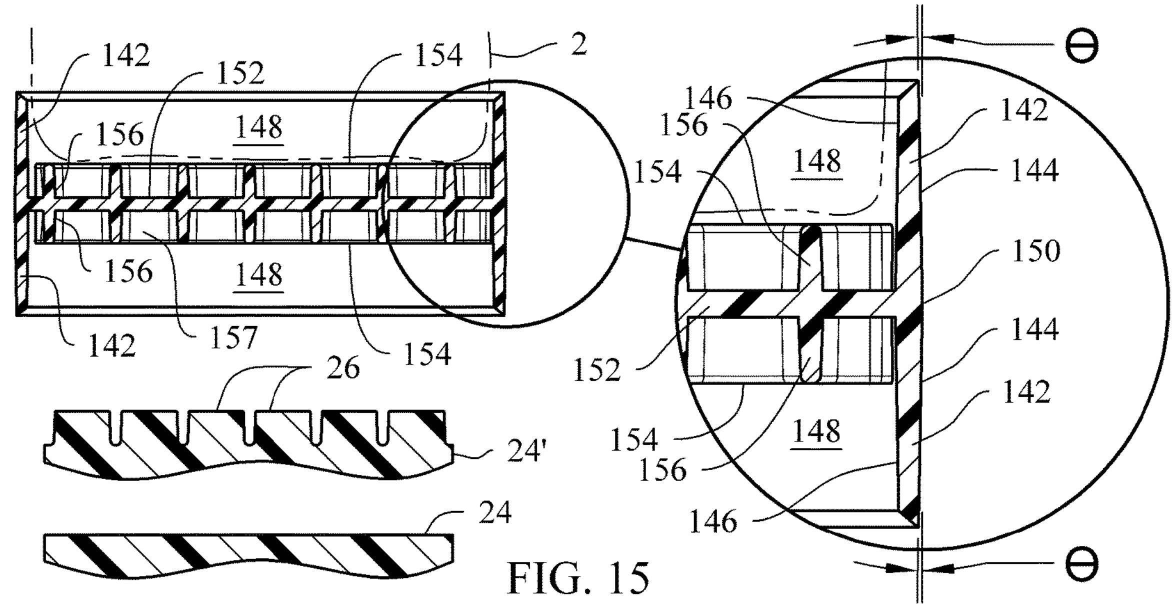
FIG. 15 is a cross-sectional view of the plunger and the plunger rod adapter taken along line 15-15 in FIG. 14 with an enlarged section showing the inwardly angled sidewalls.

Referring to FIGS. 13-15, the plunger 140 of the sausage package dispensing system is illustrated and will be described. The plunger 140 can be attachable to the plunger rod 16 of the dispensing device 12. This can be accomplished utilizing an adapter 24 that is part of or is attached to the plunger rod 16, which then is configured to fit with or attached to the plunger 140. Movement of the plunger rod 16 translates into longitudinal movement of the plunger 140 within the hollow interior of the package tube 28 or the internal cavity of the dispensing device 12. The plunger 140 can be made of, but not limited to, plastic, metal, composite, an alloy or any combination thereof.

The plunger 140 can include a pair of identical or similarly configured halves, with each half including a plunger sidewall 142 meeting at a radially arranged medial point 150 that further includes a plunger base wall 152 extending across the medial point 150 and therebetween thereby dividing the plunger 140 into two mirrored halves.

Each plunger sidewall 142 can include an exterior side 144 and an interior side 146, as best illustrated in the enlarged section of FIG. 15. Each half of the plunger 140 includes a plunger cavity 148 defined within the interior side 146 of the plunger sidewall 142 and the plunger base wall 152. The plunger cavity 148 can be configured to receive an end of the sausage package 2 therein.

A plurality of plunger protrusions 154 can extend from the plunger base wall 152 into the plunger cavity 148. The plunger protrusions 154 can be formed by a plurality of plunger protrusion walls 156 that extend away from the plunger base wall 152 in a generally geometrical shape. Each of the plunger protrusions 154 can defined its own internal cavity 157 defined by the plunger protrusion walls 156 and the plunger base wall 152 or one or more of the plunger protrusion walls 156, the plunger base wall 152 and the plunger sidewall 142. It can be appreciated that some of the plunger protrusions 154 defined in part by the plunger sidewall 142 can have a geometric shape different to that of the plunger protrusions 154 defined by only the plunger protrusion walls 156 and the plunger base wall 152.

The geometric shape of the plunger protrusions 154 can be, but not limited to, square, triangle, circular, oval, polygonal and the like.

The plunger protrusion walls 156 can have a height or length extending from the plunger base wall 152 less than a height or length of the plunger sidewall 142 for that particular half of the plunger 140. This difference in height or length can further in part define the plunger cavity 148. Further, it can be appreciated that the one or more plunger protrusion walls 156 can have a height or length different to that of other plunger protrusion walls 156.

Referring to FIG. 15, the exterior side 144 of the plunger sidewall 142 can be angle θ in relation to a longitudinal axis of the plunger 140 or the medial point 150. This angle θ can result in a free end or edge of the plunger sidewall 142 to have a thickness less than a thickness near or at the medial point 150. The angle θ can assist in insertion of the plunger 140 into and out of the open end of the package tube 28 and/or into the nozzle cavity 34, 84 of the piercing nozzle 30, 80. Further, the angle θ can assist in the longitudinal travel of the plunger 140 through the hollow interior of the package tube 28 and/or across the reinforcing ribs 18 of the dispensing device 12 if the package tube 28 is not utilized. During travel of the plunger 140 through the package tube 28, the medial point 150 can contact the interior surface of the package tube 28 thereby acting as a sliding seal thereagainst to prevent seepage of material past the plunger 140.

An interior side of the nozzle sidewall 32, 82 that defines the nozzle cavity 34, 84 can be angled to complement the angle θ of the exterior side 144 of the plunger sidewall 142. This complementary angle allows for either side or half of the plunger 140 to be fully receivable in the nozzle cavity 34, 84.

The interior side 146 of the plunger sidewall 142 can be parallel with the longitudinal axis of the plunger 140 or can be angled so that a width or diameter of the plunger cavity 148 at the free end of the plunger 140 is less than a width or diameter of the plunger cavity 148 adjacent the plunger protrusions 154. The angle of the interior side 146 can be configured to assist in insertion of the end of the sausage package 2 into the plunger cavity 148 when the plunger 140 is pressed against that end of the sausage package 2.

The plunger protrusions 154 can be configured to provide rigidity to the plunger 140 and/or air pockets to prevent a vacuum lock against the end of the sausage package 2. The air pockets can be utilized for easy removal of the sausage package 2 from the plunger cavity 148 or withdrawal of the plunger 140 away from the sausage package 2.

Further, the adapter 24 attached to the end of the plunger rod 16 can include an exterior side featuring male protrusions 26 that are configured to be received in an open space defined in the plunger protrusions 154 of the plunger 140, as best illustrated in FIG. 15. This arrangement can be configured to provide a press or friction fit of the plunger 140 to the adapter 24, allowing for removal and/or replacement of the plunger 140. Alternatively, the protrusions 26 can be omitted from the adapter 24 so that a planar or flat exterior side of the adapter 24 contacts the plunger protrusions 154, as best illustrated in FIG. 16.

It can be appreciated that the dispensing device 12 of the present invention can include draw back system (not shown) to ensure bead flow or flow of the material from the sausage package 2 ceases activation of the plunger rod 16 is ceased. The draw back system can have a configuration capable of drawing back of pressure to avoid unwanted flow of material out the piercing nozzle 30, 80 or the nozzle tip 160. The draw back system can include, but not limited to: a biasing assembly which is capable of pushing back against a part of the packaging compression assembly or against the sausage package 2; a retraction assembly which is capable of retracting at least a portion of the packaging compression assembly or the sausage package 2; or a nozzle tip moving assembly which is capable of moving the piercing nozzle 30, 80 away from the sausage package 2.

Figure 16:
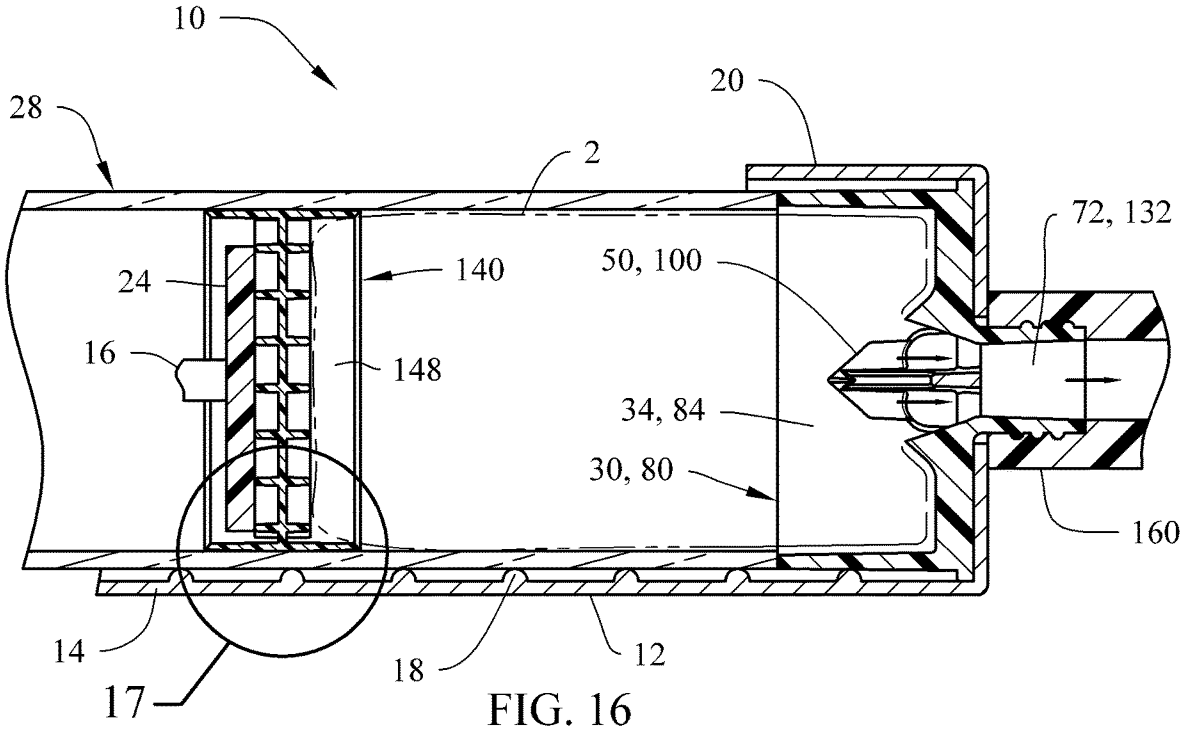
FIG. 16 is a cross-sectional view of the sausage package dispensing system of the present technology in use including the piercing nozzle and the plunger traveling within the tube.
Figure 17:
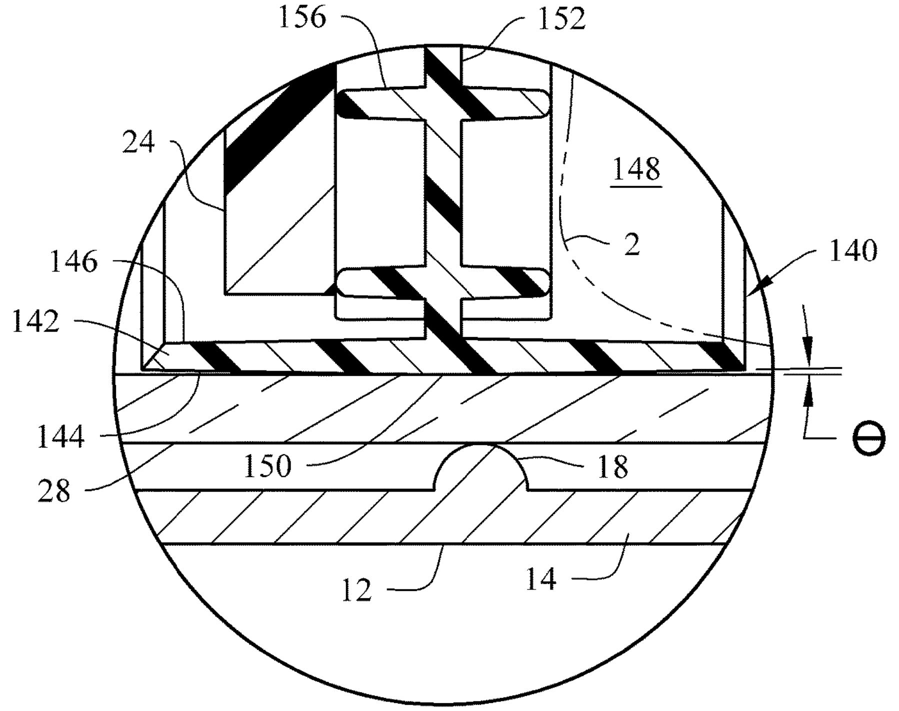
FIG. 17 is an enlarged view of the sliding connection between the medial point of the plunger and the interior surface of the tube.
Figure 18:
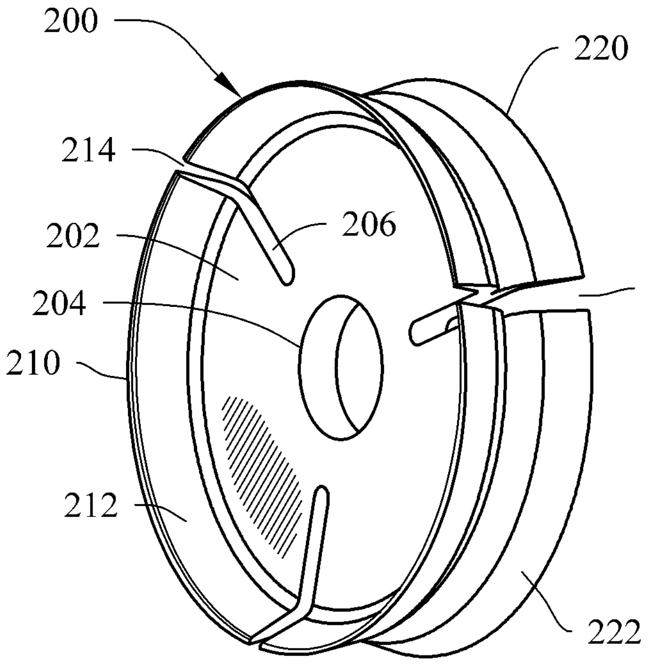
FIG. 18 is a perspective view of an embodiment of the double ended plunger constructed in accordance with the principles of the present technology.

Referring to FIGS. 16 and 17, it can now be understood that the sausage package dispensing system 10 of the present invention can be used to dispense a material, such as but not limited, caulk, adhesive, sealant, paste, cement and the like, from a sausage package 2. In exemplary use, a user can insert the sausage package 2 inside the package tube 28. The plunger 140 can be attached to the plunger rod 16 or the adapter 24, if not already part thereof. With the plunger rod 16 retracted, access to the internal cavity of the dispensing device 12 is allowed, and the piercing nozzle 30, 80 can be inserted into the dispensing end section 20 so that the male portion 70, 130 is received through dispensing end opening 22 of the dispensing end section 20.

The nozzle tip 160 can then be fitted with the male portion 70, 130 so that the piercing nozzle 30, 80 is clamped or secured to the dispensing end section 20.

While the plunger rod 16 is retracted, the sausage package 2 or the package tube 28 with the sausage package 2 therein can be inserted into the internal cavity of the dispensing device 12 so that a first end of the sausage package 2 is received in the nozzle cavity 34, 84 of the piercing nozzle 30, 80 or one of the open ends of the package tube 28 is adjacent the nozzle cavity 34, 84.

It can be appreciated that the piercing nozzle 30, 80 can be inserted into the interior space of the main housing 14 first, and after which the sausage package 2 or the package tube 28 with the sausage package 2 therein can be inserted into the interior space of the main housing 14 so that the first end of the sausage package 2 is receivable in the nozzle cavity 34, 84 of the piercing nozzle 30, 80.

With the piercing nozzle 30, 80 and sausage package 2 or the package tube 28 with the sausage package 2 therein installed in the interior space of the main housing 14, the user can then operate the dispensing device 12 to advance the plunger rod 16 which advances the plunger 140 toward a second end of the sausage package 2.

Operation of the dispensing device 12 advances the plunger 140 into the hollow interior of the package tube 28 so that a free end of the plunger 140 contacts a second end of the sausage package 2 so that the second end of the sausage package 2 is received in the plunger cavity 148 of the plunger 140. The second end of the sausage package 2 can be in contact with the plunger protrusions 154 extending into the plunger cavity 148. It can be appreciated that the angle θ associated with both halves of the plunger 140 allows for easy insertion of the plunger through the open end and into the hollow interior of the package tube 28. It can be further appreciated that the angle θ can act as an insertion guide of the plunger 140 into the package tube 28.

Continued operation of the dispensing device 12 further advances the plunger 140 and pushes the sausage package 2 through the hollow interior of the package tube 28 so that a first end of the sausage package 2 is received in the nozzle cavity 34, 84 and pressed against the piercing projections 50, 100. This advancement of the sausage package 2 by the plunger 140 allows for the piercing tip 56, 106 to puncture through the first end of the sausage package 2, thereby opening a passage between the interior of the sausage package 2 and the nozzle cavity 34, 84 and the nozzle opening 41, 89 of the piercing nozzle 30, 80.

Further continued advancement of the plunger 140 by the plunger rod 16 through the hollow interior of the package tube 28 and against the second end of the sausage package 2 could expand the sidewalls of the sausage package 2. However, the package tube 28 is configured to contain any radial or outward expansion of the sausage package 2. Further, expansion of the package tube 28 can be contained by the reinforcing ribs 18 of the main housing 14.

During advancement of the plunger 140 through the hollow interior of the package tube 28, it can be appreciated that the medial point 150 of the plunger 140 can act as a radially or perimeter seal against the interior side of the package tube 28 that defines its hollow interior. This contact provided by the medial point 150 prevents seepage of material from the sausage package 2 past the plunger 140, as best illustrated in FIG. 17. Accordingly, reducing waste of the material and providing an efficient pushing force to extrude the material from the sausage package 2. It can be appreciated that the plunger 140 can be utilized in either direction due to its mirrored structural nature.

This continued advancement of the plunger 140 can force the material out of the sausage package 2, over through the piercing projections 50, 100 and over the internal rib 60, 110, and then through the nozzle opening 41, 89 of the piercing nozzle 30, 80. The material can then be forced through the hollow interior of the nozzle tip 160 and dispensed out an opening defined or cut in a dispensing end of the nozzle tip 160.

In the exemplary, the user can visually determine the amount of material remaining in the sausage package 2 through the transparent package tube 28.

The sausage package 2 can be removed and replaced by operating the dispensing device 12 or the plunger rod 16 to withdraw the plunger 140 away from the piercing nozzle 30, 80. The user can then remove the sausage package 2 or the package tube 28 with the sausage package 2 therein from the internal cavity of the main housing 14. The emptied or used sausage package 2 can then easily be removed from the package tube 28 and discarded.

After which, the nozzle tip 160 can be removed from the male portion 70, 130 so that the piercing nozzle 30, 80 can be removed from the dispensing end section 20 for cleaning or replacement. Further, the plunger 140 can be removed from the plunger rod 16 or adapter 24 for cleaning or replacement.

According to one aspect, the present technology can include an adapter system for dispensing material contained in a collapsible package 2 from a dispensing device 12. The adapter system can include a piercing nozzle 30, 80 and a plunger 140. The piercing nozzle 30, 80 can be attachable to a dispensing end 20 of the dispensing device 12. The piercing nozzle 30, 80 can include one or more piercing projections 50, 100 configured to pierce the collapsible package 2 and allow the material in the collapsible package 2 to be dispensed when a compression assembly associated with the dispensing device 12 pushes the package 2 towards the piercing nozzle 50, 100. The plunger 140 can be operably associated with a plunger rod 16 of the dispensing device 12. The plunger 140 can be configured to be slidably receivable in a hollow interior of a package tube 28 and push the collapsible package 2 toward the piercing projections 50, 100.

According to another aspect, the present technology can include a system or device for dispensing material contained in a collapsible package 2 from a dispensing device 12. The system or device can include a piercing nozzle 30, 80 attachable to a dispensing end section 20 of the dispensing device 12. The piercing nozzle 30, 80 can include a nozzle sidewall 32, 82 and a nozzle end wall 38, 88 defining an internal nozzle cavity 34, 84 configured to receive a first end of the package. One or more recessed members 42, 90 can extend into the internal nozzle cavity 34, 84. One or more piercing projections 50, 100 can extend in part from the one or more recessed members 42, 90. The one or more piercing projections 50, 100 can be configured to pierce the sausage package 2 allowing the material in the sausage package 2 to be dispensed when a compression assembly associated with the dispensing device 12 pushes the sausage package 2 towards the piercing nozzle 30, 80. An internal nozzle rib 60, 110 can extend across a nozzle opening 41, 89 defined through the nozzle end wall 38, 88.

According to yet another aspect, the present technology can include a system for dispensing material contained in a collapsible package 2 from a dispensing device 12 and a plunger 140 attachable to a plunger rod 16 of the dispensing device 12. The system can include a piercing nozzle 30, 80 attachable to a dispensing end of the dispensing device 12. The piercing nozzle 30, 80 can include a nozzle sidewall 32, 82 and a nozzle end wall 38, 88 defining an internal nozzle cavity 34, 84 configured to receive a first end of the package. One or more recessed members 42, 90 can extend into the internal nozzle cavity 34, 84. One or more piercing projections 50, 100 can extend in part from the one or more recessed members 42, 90. The one or more piercing projection can be configured to pierce the package allowing the material in the package to be dispensed when a compression assembly associated with the dispensing device 12 pushes the package towards the piercing nozzle 30, 80. An internal nozzle rib 60, 110 can extend across a nozzle opening 41, 89 defined through the nozzle end wall 38, 88. The plunger 140 can be configured to be slidably receivable in a hollow interior of a package tube 28 and push the collapsible package 2 toward the piercing projections 50, 100.

According to yet another aspect, the present technology can include a method of using a system for dispensing material contained in a collapsible package 2 from a dispensing device 12. The method can include the steps of placing the collapsible package 2 in the dispensing device 12 between and a piercing nozzle 30, 80 and a plunger 140. Moving the plunger 140 to compress a first end of the collapsible package 2 into a nozzle cavity 34, 84 defined in the piercing nozzle 30, 80 and against one or more piercing projections 50, 100 of the piercing nozzle 30, 80. The nozzle cavity 34, 84 can be defined by a nozzle sidewall 32, 82 and a nozzle end wall 38, 88 of the piercing nozzle 30, 80. Piercing the first end of the collapsible package 2 by the one or more piercing projections 50, 100. Comprising the collapsible package 2 to flow the material out from the first end of the collapsible package 2 across an internal nozzle rib 60, 110 and through a nozzle opening 41, 89 defined through the nozzle end wall 38, 88. The internal nozzle rib 60, 110 extending across the nozzle opening 41, 89.

Some or all embodiments of the present technology can include a package tube 28 that can define a hollow interior therethrough configured to receive the sausage package 2 therein.

In some or all embodiments, the plunger 140 can be operably associated with a plunger rod 16 of the dispensing device 12. The plunger 140 can include a plunger sidewall 142 featuring a medial point 150 having a width or diameter greater than any other part of the plunger sidewall 142 so that the medial point 150 is in slidable contact with an interior surface of the package tube 28 that defines the hollow interior of the package tube. The plunger 140 can be configured to push the collapsible package 2 toward the piercing projections 50, 100.

In some or all embodiments, the piercing nozzle 30, 80 can further include a male portion 70, 130 defining a male portion bore 72, 132 defined therethrough and in communication with the nozzle opening 41, 89.

In some or all embodiments, the one or more piercing projections 50, 100 can include two or more piercing walls 52, 102 angularly oriented with each other to form a V-shape.

In some or all embodiments, the piercing walls 52, 102 can each include an angled edge 54, 104 that converge to form a piercing tip 56, 106.

In some or all embodiments, the one or more recessed members 42, 90 can each include a pair of opposed recessed member sidewalls 46, 92, one or more recessed member end walls 44, 94 and a recessed member bottom wall 48, 96. The piercing walls 52, 102 can extend from any one of or any combination of the recessed member sidewalls 46, 92, the one or more recessed member end walls 44, 94 and the recessed member bottom wall 48, 96.

In some or all embodiments, the internal nozzle rib 60, 110 can connect between the one or more piercing projections 50, 100.

In some or all embodiments, the internal nozzle rib 60, 110 can include a middle portion 62, 112 that can extend across the nozzle opening 41, 89, and a piercing projection portion 64, 114 that can extend at an angle from opposite ends of the middle portion 62, 112 toward and connecting to at least one of the one or more piercing projections 50, 100.

The middle or central portion 62, 112, which can be appreciated as a partition wall, can be configured to assist in maneuvering an end clip of the sausage package 2 out of the way, thereby providing clear passage for easy flow of the material after the sausage package 2 is pierced by the piercing tip 56, 106. It is known that some sausage packages 2 include a clip that seals off each end thereof. After piercing, the clip at the end of the sausage package 2 may get lodged or may block the opening 22, 89 and/or the bore 72, 132, thereby preventing or limiting the flow or the material from the sausage package 2 and out the male portion 70, 130. To overcome this potential problem, the middle or central portion 62, 112 can act as a member that prevents the end clip from entering the opening 22, 89.

Some or all embodiments of the present technology can include a plunger 140 attachable to a plunger rod 16 of the dispensing device 12 and configured to travel along a longitudinal axis of the dispensing device 12 toward the piercing nozzle 30, 80 to compress the sausage package 2 against the one or more piercing projections 50, 100.

In some or all embodiments, the plunger 140 can include a plunger sidewall 142 and a plunger base wall 152 defining an internal plunger cavity 148. The internal plunger cavity 148 can be configured to receive a second end of the sausage package 2.

In some or all embodiments, the plunger 140 can include multiple plunger protrusions 154 each including plunger protrusion walls 156 extending from the plunger base wall 152 into the plunger cavity 148. The plunger protrusion walls 156 and the plunger base wall 152 can define a plunger protrusion cavity in communication with the plunger cavity 148.

In some or all embodiments, the plunger protrusion walls 156 can have a length from the plunger base wall 152 greater than a length of the nozzle sidewall 32, 82 from the plunger base wall 152.

In some or all embodiments, the plunger sidewall 142 can include an interior side 146 in part defining the plunger cavity 148 and an angled exterior side 144 creating a first thickness of a free end of the plunger sidewall 142 less than a second thickness of the plunger sidewall 142 adjacent the plunger base wall 152.

In some or all embodiments, the plunger 140 can include a second plunger sidewall 142 inverted to and extending from the plunger sidewall 142. The plunger 140 can further include second plunger protrusions 154 inverted to the plunger protrusions 154 and extending from the plunger base wall 152.

In some or all embodiments, the plunger protrusion walls 156 can be configured to form the plunger protrusions 154 in a geometric shape.

In some or all embodiments, the plunger rod 16 can include a plunger adapter 24 including male protrusions 26 that can be configured to be receivable in an open space defined in the plunger protrusions 154 of the plunger 140.

Referring now to FIGS. 18-29, according to an embodiment, a new and novel plunger can be utilized to dispense a material from the package tube or from a collapsible package such as a sausage package. The plunger can include a main wall and a plurality of sectors extending from the main wall. Each of the sectors can include a flange extending from a perimeter edge of the sectors. The sectors adjacent to each other can be separated by a slot.

The sectors can bend in relation to the main wall when a predetermined force is applied to the sectors by the sausage package or the material in the package tube. This can inherently press a perimeter edge of the flange against an internal surface of the package tube that defines the plunger cavity.

The flanges may also bend or deform upon application of the predetermined force to provide a surface area that contacts the internal wall of the package tube in combination with a perimeter edge of the flange.

Referring to FIGS. 18-22, according to an embodiment, a new and novel double ended plunger 200 can be utilized to dispense a material from the package tube 28. The double ended plunger 200 can include two opposing plunger sides separated into sectors that can flex or bend. The two opposing plunger sides can be identified as a first side 210 and a second side 220. It can be appreciated that the double ended plunger 200 can be reversibly attachable to the plunger rod 16 to provide the user with different flexing characteristics of the sectors for use with different materials in the package tube 28.

The double ended plunger 200 can include a main wall 202 featuring a rod bore 204 centrally defined through the main wall 202. The rod bore 204 is configured to receive an end of the plunger rod 14 therein or therethrough or a fastener configured to secure the plunger 200 to the plunger rod 14. It can be appreciated that the plunger 200 can be removably attachable to the plunger rod 14 utilizing any known means such as, but not limited to, friction fitted, press fitted, mechanically fitted, fasteners, latches, threading, clips, and the like.

A plurality of main slots 206 can be defined through the main wall 202 from a perimeter edge in a direction toward the rod bore 204. In an embodiment, the main slots 206 may not extend into nor are in communication with the rod bore 204, thereby leaving a section of the main wall 202 between an end of the main slots 206 and a surface of the main wall 202 that defines the rod bore 204.

Figure 19:
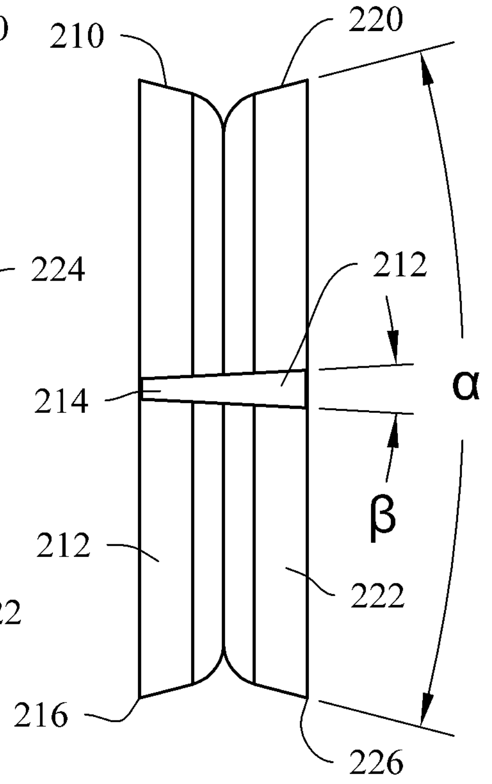
FIG. 19 is a front plane view of the double ended plunger of FIG. 18.

Extending from the perimeter edge of the main wall 202 in opposing direction is a first flange 212 and a second flange 222, thereby creating a mirror configuration. The first and second flanges 212, 222 project out from the main wall 202 at an outward angle α, as best illustrated in FIG. 19. This creates a width or diameter of a free perimeter edge of the first and second flanges 212, 222 that is greater than a width or diameter of the main wall 202. This also creates an interior open space capable of receiving an end of the sausage package 2.

The first flange 212 includes first flange slots 214 defined therethrough. Each of the first flange slots 214 is aligned with and in communication with one of the main slots 206. The second flange 222 includes second flange slots 224 defined therethrough. Each of the second flange slots 224 is aligned with and in communication with one of the main slots 206 and with a corresponding first flange slot 214.

The main slots 206, the first flange slots 214 and the second flange slots 224 thereby creates sectors 218 between each of the main slots 206, the first flange slots 214 and the second flange slots 224.

The main slots 206, the first flange slots 214 and the second flange slots 224 can have a constant width or can include a varying width configured at an angle β from the first side 210 to the second side 220 or vice versa, as best illustrated in FIG. 19. The above configuration of the angle β is exemplary as any angle can be utilized and in any direction.

Figure 20A:
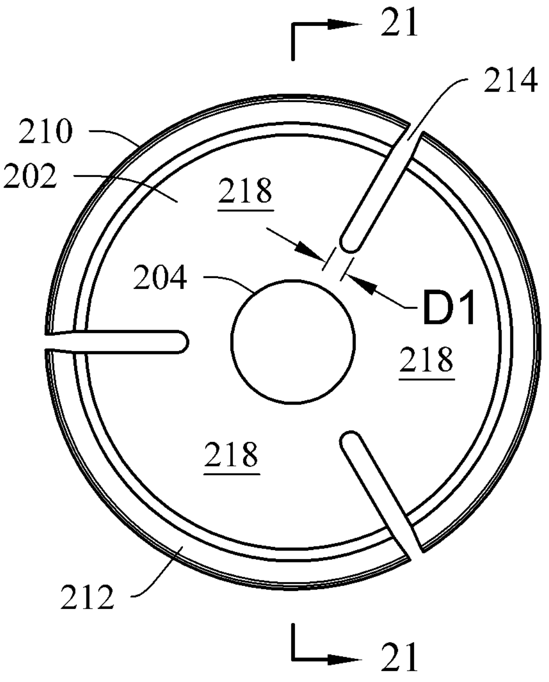
FIG. 20A is a left side plane view of the double ended plunger of FIG. 18.
Figure 20B:
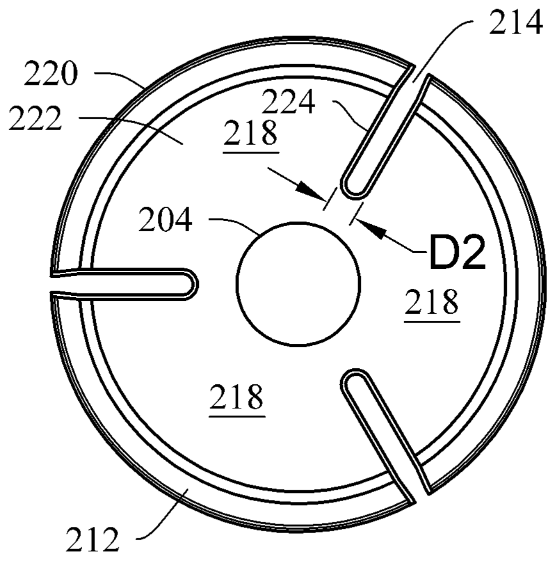
FIG. 20B is a right side plane view of the double ended plunger of FIG. 18.

As best illustrated in FIGS. 20A and 20B, the angle β of the slots 206, 214, 224 can provide a first thickness or width D1 of the slots 206, 214, 224 of the first side 210, and a second thickness or width D2 of the slots 206, 214, 224 of the second side 220. Further, the length or width D1, D2 can vary along a longitudinal axis and/or a lateral axis of any one of or any combination of the main slots 206, the first flange slots 214 and the second flange slots 224. In the above exemplary description, the length or width D1 of the first side 210 can be less than the length or width D2 of the second side 220. The angle β of the slots 206, 214, 224 can also provide a difference in thickness, width or diameter of the first flange 212 compared to the second flange 222. Any one of or any combination of the above differences can create different bending or flexing characteristics between the first side 210 and the second side 220.

Figure 21:
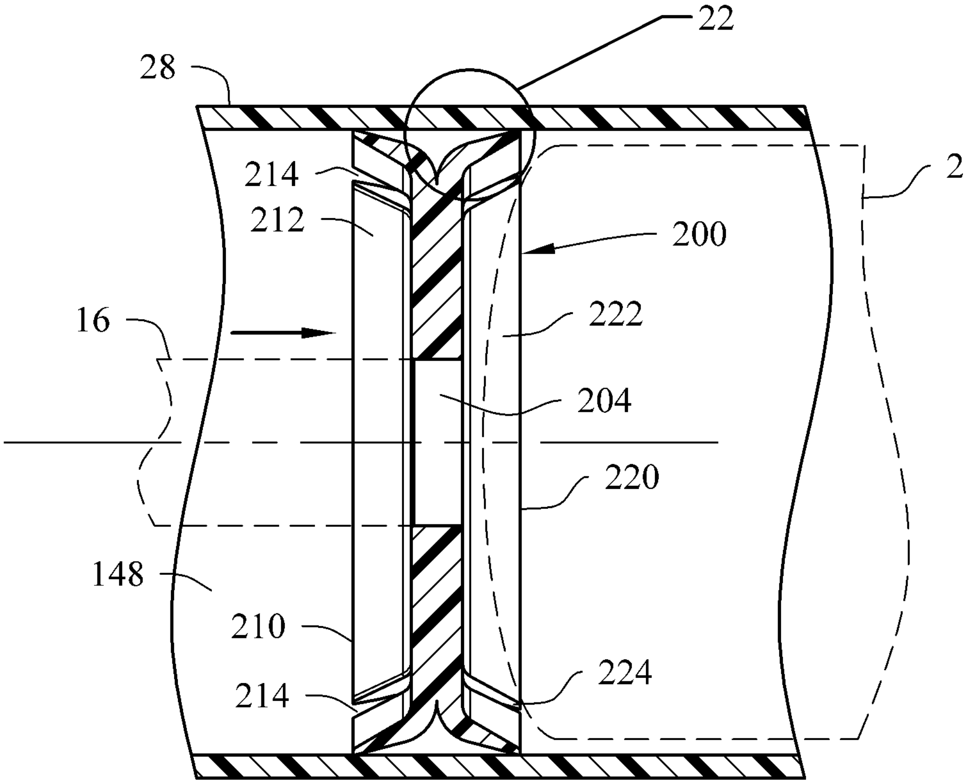
FIG. 21 is a cross-section view of the double ended plunger taken along line 21-21 in FIG. 20A and located within the package tube.
Figure 22:
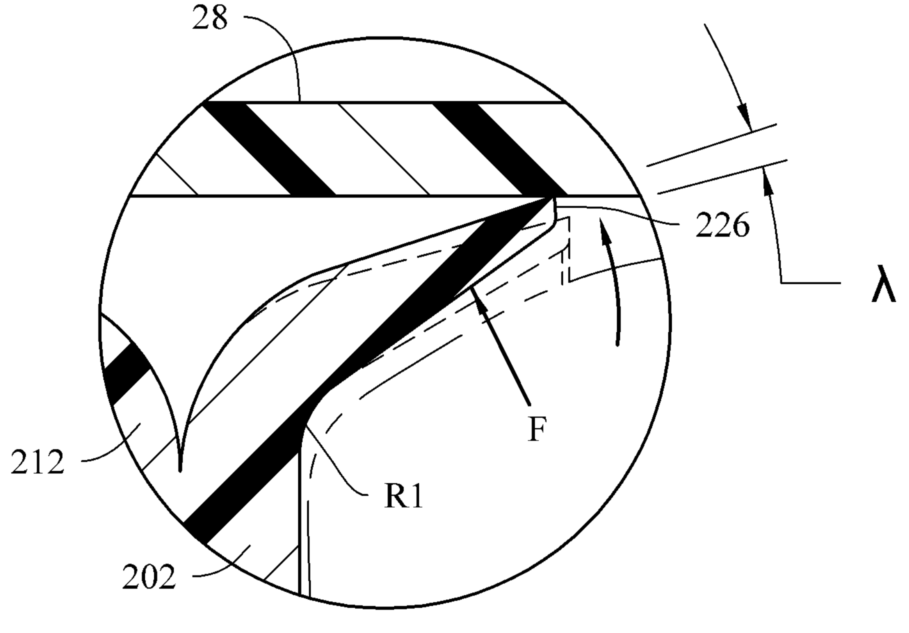
FIG. 22 is an enlarged cross-section view taken from section 22 in FIG. 21 showing the sector of the double ended plunger being pushed outwardly by the sausage package and sealed against the internal wall of the package tube.
Figure 23:
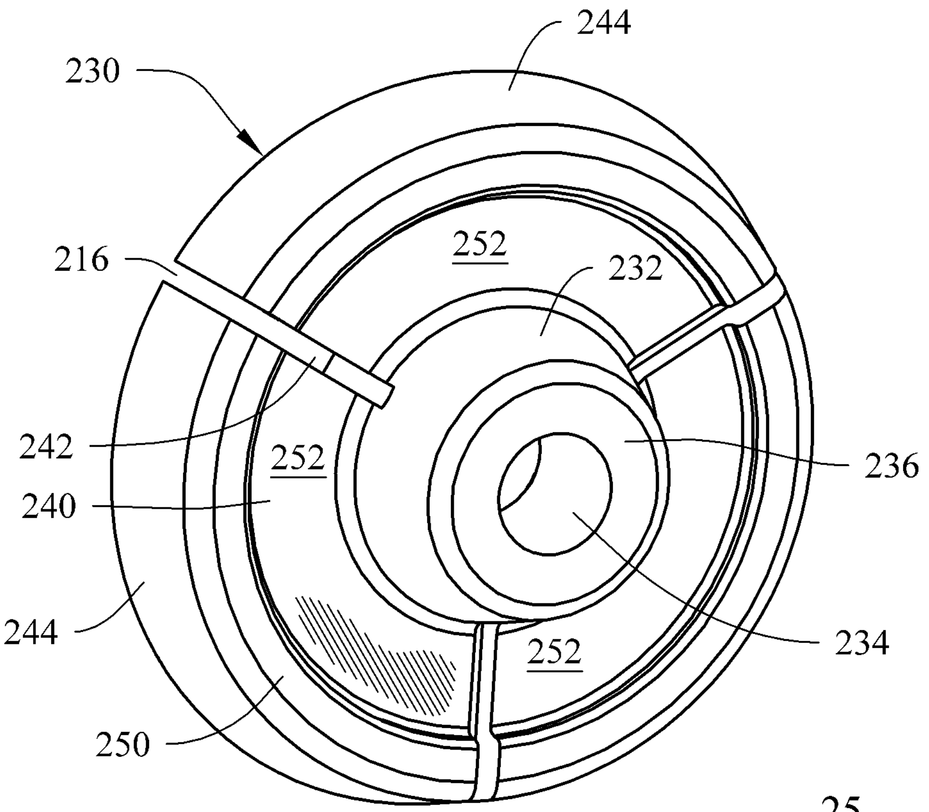
FIG. 23 is a perspective view of an embodiment of the single ended plunger constructed in accordance with the principles of the present technology.

Referring to FIGS. 21 and 22, in an exemplary use, the double ended plunger 200 can be utilized in the package tube 28 of the sausage dispensing system of the present technology or with any dispensing system utilizing a tube. During operation, the plunger rod 16 is advanced thereby moving the plunger 200 through the plunger cavity 148 defined in the package tube 28. As the plunger rod 16 is advanced, the plunger 200 contacts an end of the sausage package 2, thereby forcing the opposite end of the sausage package 2 to be pierced allowing the material in the sausage package 2 to be dispensed.

In the exemplary configuration of the second side 220 pressing against the end of the sausage package 2, the sausage package 2 contacts the sectors 218 of the second side 220 and an interior surface of the second flange 222. Further advancement of the plunger 200 creates a force F pressed against the sectors and the second flange 222 by the sausage package 2. This force F can bend or flex any one or any combination of the sectors 218 and the second flange 222 so that a perimeter edge 226 of the second flange 222 presses against the interior wall of the package tube 28 that defines the plunger cavity 148.

The second flange 222 can bend or flex by an angle or arc γ in part by a transition radius R1 between the main wall 202 and the second flange 222, as best illustrated in FIG. 22. The sectors 218 can bend or flex in part by the main slots 206, the first flange slots 214 and the second flange slots 224.

Increased pressure applied to the sausage package 2 by the second side 220 increases the force F applied to the sectors 218 and the second flange 222, thereby increasing the sealing contact of the perimeter edge 226 and the interior surface of the package tube 28. The increased force F can further deform the flange 222 to provide an increased contact surface area against the package tube 28. This increased contact surface area can include the perimeter edge 226 and additional surface area of an exterior side of the flange 222 facing the package tube 28 that is pressed against the package tube 28 due to any deformation of the flange by the force F. This configured substantially prevents material in the plunger cavity 148 from passing around the plunger 200, thereby allow for more material to be dispensed from the dispenser.

It can be appreciated the if the plunger 200 is reversed so that the first side 210 contacts the sausage package 2 and a perimeter edge 216 of the first flange 212 contacts the interior surface of the package tube 28, the bending or flexing characteristics of the sectors 218 and/or the first flange 212 can be different to that of if the second side 220. This is in part due to the angle α, and the thickness or width D1, D2 that defines an amount of the main wall 202 that defines the sectors 218.

It can further be appreciated that the plunger 200 can be utilized in the package tube 28 without the sausage package, where the material is provided or filled in the tube, or provided in a tube that is received in the package tube 28.

Referring now to FIGS. 23-26, according to another embodiment, a new and novel single ended plunger 230 can be utilized to dispense a material from the package tube 28. The single ended plunger 230 can include a mounting side and a plunger side separated into sectors that can flex or bend. It can be appreciated that the mounting side of the single ended plunger 230 can be attachable to the plunger rod 16.

The mounting side of the single ended plunger 230 can include a central hub 232 featuring a rod bore 234 centrally defined therethrough and a free end 236. The rod bore 234 is configured to receive an end of the plunger rod 14 therein or therethrough or a fastener configured to secure the plunger 230 to the plunger rod 14. The free end 236 can receive or abut an end of the plunger rod 16. It can be appreciated that the plunger 230 can be removably attachable to the plunger rod 14 utilizing any known means such as, but not limited to, friction fitted, press fitted, mechanically fitted, fasteners, latches, threading, clips, and the like.

A main wall 240 can extend laterally or angularly from the hub 232 in relation with a longitudinal axis of the rod bore 234.

Figure 24:
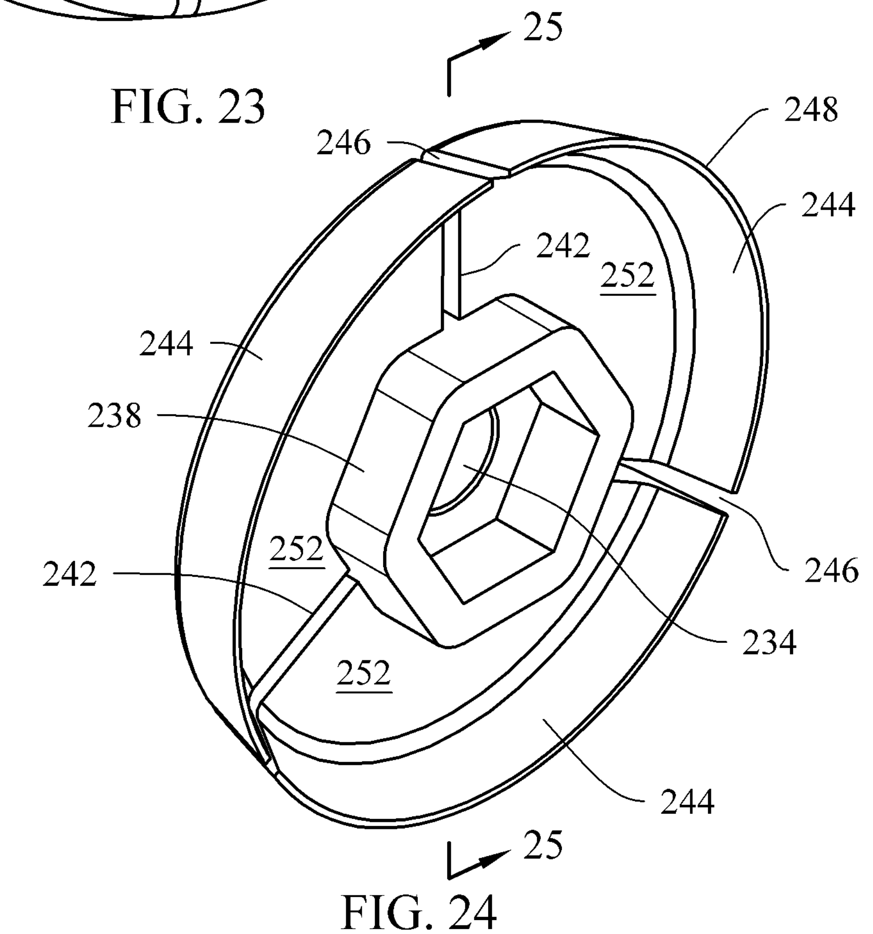
FIG. 24 is an alternate side perspective view of the single ended plunger of FIG. 23.
Figure 25:
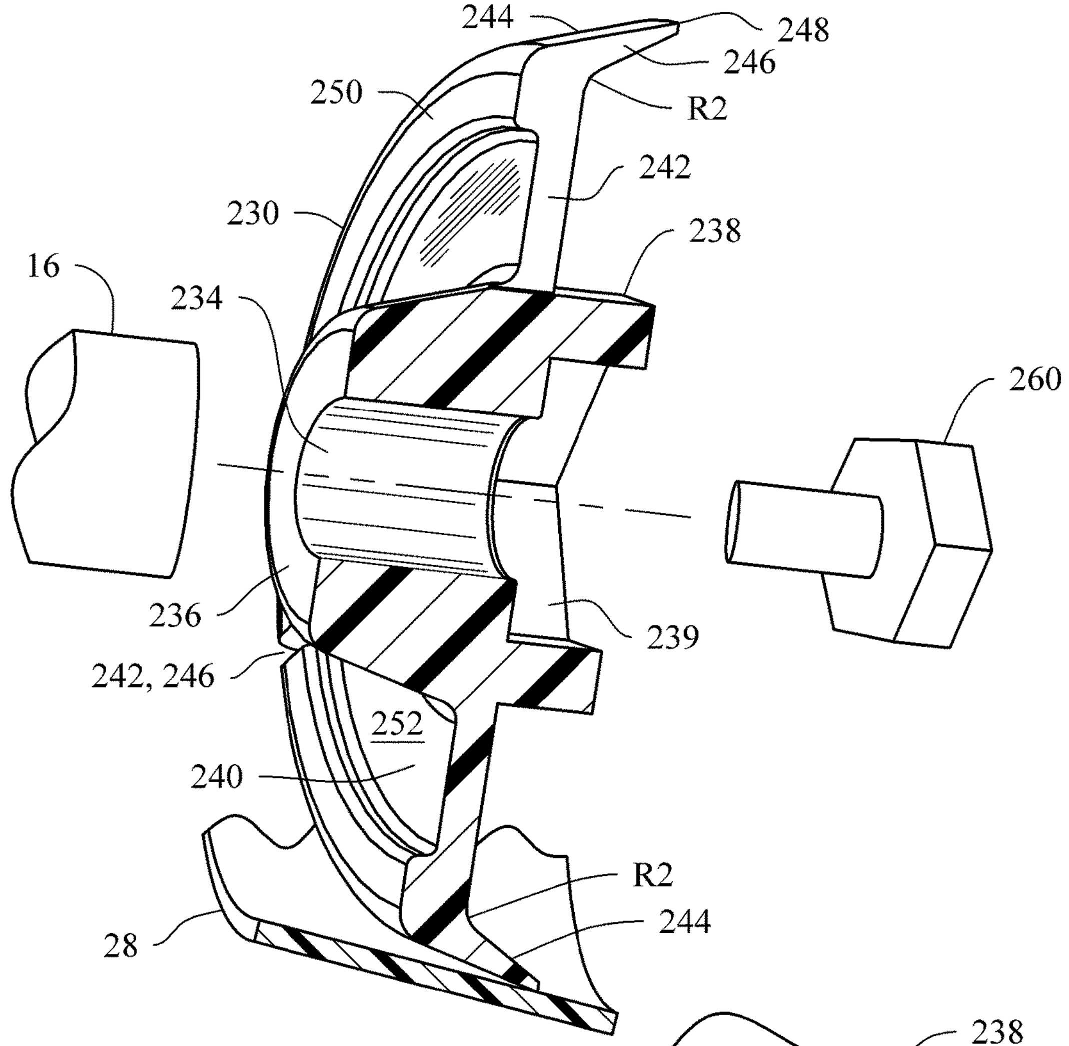
FIG. 25 is a cross-section view of the single ended plunger taken along line 25-25 in FIG. 24 and located within the package tube.

The plunger side can include a fastener receiving member 238 having a configuration or cavity 239 capable of receiving a head of a fastener 260, as best illustrated in FIGS. 24 and 25. The cavity 239 is in communication with the rod bore 234. In the exemplary, with the head of the fastener 260 received in the fastener receiving member 238 and its threaded shaft extending through the rod bore 234, the plunger rod 16 can be engaged with the threaded shaft of the fastener 260 thereby securing the plunger 230 to the plunger rod 16 with the plunger side extending away from the plunger rod 16.

A plurality of main slots 242 can be defined through the main wall 240 from a perimeter edge in a direction toward the hub 232.

Extending from the perimeter edge of the main wall 240 is a flange 244 by way of a transition edge 250. The flange 244 projects out from the main wall 240 at an outward angle similar to that of the double ended plunger 200. This creates a width or diameter of a free perimeter edge of the flange 244 that is greater than a width or diameter of the main wall 240. This also creates an interior open space capable of receiving an end of the sausage package 2.

The flange 244 includes flange slots 246 defined therethrough. Each of the flange slots 246 is aligned with and in communication with one of the main slots 242 of the main wall 240. The main slots 242 and the flange slots 246 creates sectors 252 between each of the main slots 242 and the flange slots 246.

The main slots 206 and the flange slots 246 can have a constant width or can include a varying width configured at an angle from the free end 236 to a perimeter edge 248 of the flange 244 or vice versa.

Figure 26:
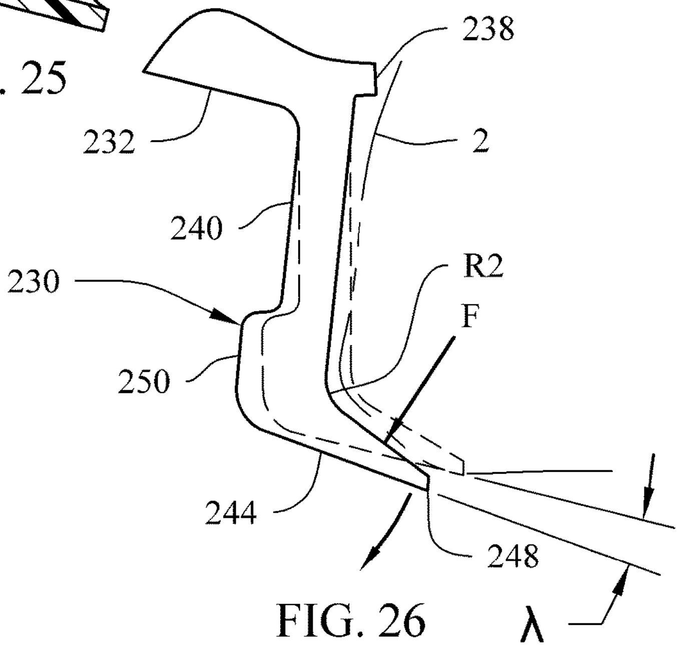
FIG. 26 is an enlarged cross-section view showing the sector of the single ended plunger sealed being pushed outwardly by the sausage package.

Referring to FIGS. 25 and 26, in an exemplary use, the single ended plunger 230 can be utilized in the package tube 28 of the sausage dispensing system of the present technology or with any dispensing system utilizing a tube. During operation, the plunger rod 16 is advanced thereby moving the plunger 230 through the plunger cavity defined in the package tube 28. As the plunger rod 16 is advanced, the plunger side of the plunger 230 featuring the interior open space of the flange 244 and the fastener receiving member 238 contacts an end of the sausage package 2, thereby forcing the opposite end of the sausage package 2 to be pierced allowing the material in the sausage package 2 to be dispensed.

As the plunger side of the plunger 230 presses against the end of the sausage package 2, the sausage package 2 contacts the sectors 252 and an interior surface of the flange 244. Further advancement of the plunger 230 creates a force F pressed against the sectors 252 and the flange 244 by the sausage package 2. This force F can bend or flex any one or any combination of the sectors 218 and the flange 244 so that the perimeter edge 248 of the flange 244 presses against the interior wall of the package tube 28 that defines the plunger cavity.

The flange 244 can bend or flex by an angle or arc $\gamma$ in part by a transition radius R2 between the main wall 240 and the flange 244, as best illustrated in FIG. 26. The sectors 252 can bend or flex in part by the main slots 242 and the flange slots 246.

Increased pressure applied to the sausage package 2 by the plunger side increases the force F applied to the sectors 252 and the flange 244, thereby increasing the sealing contact of the perimeter edge 248 and the interior surface of the package tube 28. The increased force F can further deform the flange 244 to provide an increased contact surface area against the package tube 28. This increased contact surface area can include the perimeter edge 248 and additional surface area of an exterior side of the flange 244 facing the package tube 28 that is pressed against the package tube 28 due to any deformation of the flange by the force F. This configured substantially prevents material in the plunger cavity from passing around the plunger 230, thereby allow for more material to be dispensed from the dispenser.

An embodiment can include a plunger 140, 200, 230 for dispensing a material. The plunger 140, 200, 230 can include a main wall 152, 202, 240 and a plurality of sectors 156, 218, 252 extending from the main wall. Each of the sectors 156, 218, 252 can include a flange 142, 212, 222, 244 extending from a perimeter edge of the sectors. The sectors adjacent to each other can be separated by a slot 157, 206, 214, 224, 242, 246.

An embodiment can include a method of operating a plunger 140, 200, 230 to dispense a material from collapsible package 2 in a package tube 28. The plunger can include a main wall 152, 202, 240 and a plurality of sectors 156, 218, 252 extending from the main wall. Each of the sectors can include a flange 142, 212, 222 extending from a perimeter edge of the sectors. The sectors adjacent to each other can be separated by a slot 157, 206, 214, 224, 242, 246. The method can include the steps of advancing the plunger 140, 200, 230 in the package tube 28 so an end of the collapsible package 2 is received adjacent to the sectors 156, 218, 252. Forcing the plunger 140, 200, 230 against the end of the collapsible package 2 to create a force F applied to at least the flange 142, 212, 222 of the sectors 156, 218, 252. Bending, by way of the force F, the flange 142, 212, 222 of the sectors 156, 218, 252 in relation to the main wall 152, 202, 240 so that at least a perimeter edge of the flange 142, 212, 222 contacts an interior surface of the package tube 28.

An embodiment can include a system or device for dispensing material contained in the collapsible package 2 from the dispensing device 12. The system or device can include a piercing nozzle 30, 80 and a plunger 140, 200, 230. The piercing nozzle 30, 80 can be attachable to the dispensing end 20 of the dispensing device 12. The piercing nozzle 30, 80 can include the nozzle sidewall 32, 82 and the nozzle end wall 38, 88 defining the internal nozzle cavity 34, 84 configured to receive a first end of the package 2. One or more recessed members 42, 90 can extend into the internal nozzle cavity 34, 84. One or more piercing projections 50, 100 can extend in part from the one or more recessed members 42, 90. The one or more piercing projections 50, 100 can be configured to pierce the package 2 allowing the material in the package to be dispensed when a compression assembly associated with the plunger 140, 200, 230 pushes the package 2 towards the piercing nozzle 30, 80. The plunger 140, 200, 230 can include the main wall 152, 202, 240 and the plurality of sectors 156, 218, 252 extending from the main wall. Each of the sectors 156, 218, 252 can include the flange 142, 212, 222 extending from a perimeter edge of the sectors. The sectors 156, 218, 252 adjacent to each other can be separated by the slot 157, 206, 214, 224, 242, 246.

In some or all embodiments, the main wall 202, 240 can define the bore 204, 234 therethrough that is operatively engageable with the plunger rod 16.

In some or all embodiments, the flange 142, 212, 222 can be a first flange 142, 212 extending from the perimeter edge in a first direction to create a first side of the plunger, and a second flange 142, 222 extending from the perimeter edge in a second direction opposite to that of the first direction to create a second side of the plunger.

In some or all embodiments, the first flange 142, 212 can extend away from the perimeter edge at an angle.

In some or all embodiments, the second flange 142, 222 can extend away from the perimeter edge at an angle.

In some or all embodiments, the first flange 142, 212 can extend away from the perimeter edge at a first angle. The second flange 142, 222 can extend away from the perimeter edge at a second angle. The first angle can be equal to the second angle, or the first angle can be different to the second angle.

In some or all embodiments, the slot 157, 206, 214, 224, 242, 246 can be defined through the flange 142, 212, 222 and the sectors 156, 218, 252, respectively.

In some or all embodiments, the slot 157, 206, 214, 224, 242, 246 can have a width that increases from the first side 148, 210 to the second side 148, 220.

In some or all embodiments, the sectors 156, 218, 252 can be configured to bend in relation to the main wall 152, 202, 240 when a predetermined force F is applied to the sectors.

In some or all embodiments, the flange 142, 212, 222 can have a perimeter edge 150, 226, 248 configured to contact an internal wall of the package tube 28 when the plunger is received in the package tube.

In some or all embodiments, the flange 142, 212, 222 can be configured to deform upon application of the predetermined force F to provide a surface area that contacts the internal wall of the package tube 28 in combination with the perimeter edge 150, 226, 248.

In some or all embodiments, the plunger 140, 200, 230 can be configured to slide in the package tube 28 of the dispensing device 12 and to contact an end of the collapsible package 2 contained in the package tube.

Some or all embodiments of the present technology can include the central hub 232 defining the rod bore 234 therethrough. The main wall 240 can extend from the central hub 232.

Some or all embodiments of the present technology can include the fastener receiving member 238 extending from the central hub 232. The fastener receiving member can define a fastener head receiving cavity that is in communication with the rod bore 234. A fastener 260 secures the plunger 230 to the plunger rod 16.

It can further be appreciated that the plunger 230 can be utilized in the package tube 28 without the sausage package, where the material is provided or filled in the tube, or provided in a tube that is received in the package tube 28.

While embodiments of the sausage package dispensing system have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above-described. And although controllably dispensing material from a plunger has been described, it should be appreciated that the plunger herein described is also suitable for dispensing any material stored in a packaging or container by piercing the packaging using advancing pressure supplied by a moving piston.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

What is claimed as being new and desired to be protected by Letters Patent of the United States is as follows:

1. A plunger for dispensing a material, the plunger comprising:

a main wall attachable with a plunger rod; and a first sidewall extending from the main wall at a first angle in relation to a longitudinal axis of the plunger, the first sidewall having a free end with an exterior side, the exterior side of the free end of the first sidewall is spaced from an interior surface of a package tube when the plunger is received in the package tube due to the first angle;

wherein the first sidewall and the main wall define a plunger cavity.

2. The plunger according to claim 1, wherein the main wall is operatively engageable with the plunger rod.

3. The plunger according to claim 1, wherein the first sidewall extends from a perimeter edge of the main wall in a first direction to create a first side of the plunger, and wherein the plunger includes a second sidewall extending from the perimeter edge in a second direction opposite to that of the first direction to create a second side of the plunger opposite the first side.

4. The plunger according to claim 3, wherein the second sidewall extends away from the perimeter edge at a second angle, and wherein the second sidewall having a free end with an exterior side and, the exterior side of the free end of the second sidewall is spaced from the interior surface of the package tube when the plunger is received in the package tube due to the second angle.

5. The plunger according to claim 4, wherein the second angle is different to the first angle.

6. The plunger according to claim 4, wherein the first angle is equal to the second angle.

7. The plunger according to claim 4, wherein a radial medial point between the first and second sidewalls is configured to contact the interior surface of the package tube containing material to be dispensed by movement of the plunger.

8. The plunger according to claim 1 further comprises one or more plunger protrusion walls extending from the main wall into the plunger cavity.

9. The plunger according to claim 1, wherein the main wall is configured to bend when a predetermined force is applied thereto.

10. The plunger according to claim 9, wherein a perimeter edge of the first sidewall is configured to contact an internal wall of a package tube when the plunger is received in the package tube.

11. The plunger according to claim 9, wherein the main wall is configured to deform upon application of the predetermined force to provide a surface area that contacts an internal wall of a package tube.

12. The plunger according to claim 9, wherein the plunger is configured to slide in a package tube of a dispensing device and to contact an end of a collapsible package contained in the package tube.

13. A plunger for dispensing a material from a collapsible package in a package tube, the plunger comprising:

a main wall attachable with a plunger rod, the main wall being configured to deform when a predetermined force is applied thereto; and one or more sidewalls each extending from the main wall at an angle in relation to a longitudinal axis of the plunger, the sidewalls each having a free end with an exterior side, the exterior side of the free end of the sidewalls is spaced from an interior surface of a package tube when the plunger is received in the package tube due to the angle;

wherein the sidewalls and the main wall define a plunger cavity configured to receive an end of a collapsible package containing a material dispensable by movement of the plunger;

wherein a section of the sidewalls is configured to contact the interior surface of the package tube containing the collapsible package by movement of the plunger.

14. The plunger according to claim 13, wherein the sidewalls extend from a perimeter edge of the main wall in a first direction to create a first side of the plunger, and wherein the plunger includes one or more second sidewalls extending from the perimeter edge in a second direction opposite to that of the first direction to create a second side of the plunger opposite the first side.

15. The plunger according to claim 13 further comprises one or more plunger protrusion walls extending from the main wall into the plunger cavity.

16. The plunger according to claim 13, wherein the section of the sidewalls that contacts the interior surface if a radial medial point of the sidewalls.

17. The plunger according to claim 13, wherein the plunger is configured to slide in the package tube of a dispensing device and to contact the end of the collapsible package contained in the package tube.

18. A method of operating a plunger to dispense a material from collapsible package in a package tube, the plunger comprising a main wall and a sidewall extending from the main wall at an angle in relation to a longitudinal axis of the plunger, the sidewall having a free end with an exterior side; the method comprising the steps of:

a) advancing the plunger in the package tube so an end of the collapsible package is received in a plunger cavity defined by the main wall and the sidewall, and the free end of the sidewall is spaced from an interior surface of the package tube due to the angle;

b) forcing the plunger against the end of the collapsible package to create a force applied to any one of or any combination of the main wall and the sidewall; and c) bending, by way of the force, the any one of or any combination of the main wall and the sidewall so that at least a radial medial point of the sidewall contacts the interior surface of the package tube.

* * * * *